(12) United States Patent
Johnson

(10) Patent No.: US 6,711,896 B1
(45) Date of Patent: Mar. 30, 2004

(54) NON-GROUNDED HYDRAULIC TRANSMISSION APPARATUS

(76) Inventor: Kenneth O. Johnson, 8360 Arapaho La., Cincinnati, OH (US) 45243

(*) Notice: Subject to any disclaimer, the term of this patent is extended or adjusted under 35 U.S.C. 154(b) by 0 days.

(21) Appl. No.: 09/979,295

(22) PCT Filed: May 22, 2000

(86) PCT No.: PCT/US00/14054

§ 371 (c)(1),
(2), (4) Date: Nov. 20, 2001

(87) PCT Pub. No.: WO00/71907

PCT Pub. Date: Nov. 30, 2000

Related U.S. Application Data

(60) Provisional application No. 60/135,340, filed on May 21, 1999.

(51) Int. Cl.[7] .............................................. F16D 33/00
(52) U.S. Cl. .......................................... 60/363; 60/364
(58) Field of Search ........................... 60/363, 364, 330

(56) References Cited

U.S. PATENT DOCUMENTS

| | | |
|---|---|---|
| 1,129,720 A | 2/1915 | Patterson |
| 1,307,864 A | 6/1919 | Jones |
| 1,965,518 A | 7/1934 | Wilson |
| 2,002,629 A | 5/1935 | Cobb et al. |
| 2,168,862 A | 8/1939 | De Lavaud |
| 2,333,674 A | 11/1943 | Powell |
| 2,357,654 A | 9/1944 | Horton |
| 2,380,734 A | 7/1945 | Eastin |
| 2,389,174 A | 11/1945 | Whitworth |
| 2,469,085 A | 5/1949 | Sheppard |
| 2,909,034 A | 10/1959 | Jandasek |
| 3,271,958 A | 9/1966 | Meyerhoff |
| 3,306,041 A | 2/1967 | Verzolla |
| 3,327,478 A | 6/1967 | Alexandrescu |
| 3,431,728 A | 3/1969 | Bezimensky |
| 4,037,692 A | 7/1977 | McFarland |
| 4,113,075 A | 9/1978 | Walker |
| 4,186,555 A | 2/1980 | Fauconnet |
| 4,406,121 A | 9/1983 | Pelto |
| 4,672,810 A | 6/1987 | Marlowe |
| 5,065,509 A | 11/1991 | Sahashi |
| 5,331,811 A | 7/1994 | Giberson |
| 5,348,127 A | 9/1994 | Murata et al. |
| 5,394,694 A | 3/1995 | Doumov et al. |
| 5,409,428 A | 4/1995 | Antonov |
| 5,794,436 A | 8/1998 | Maeda |

FOREIGN PATENT DOCUMENTS

| | | |
|---|---|---|
| FR | 973.135 | 2/1951 |
| FR | 2 339 101 | 8/1977 |
| GB | 328093 | 4/1930 |
| GB | 711546 | 7/1954 |

*Primary Examiner*—Edward K. Look
*Assistant Examiner*—Michael Leslie
(74) *Attorney, Agent, or Firm*—Bose McKinney & Evans LLP

(57) ABSTRACT

A non-grounded hydraulic transmission apparatus (16) is provided for transferring power from a power source to a work unit, Transmission apparatus (16) includes an input device (20) having an input shaft (26) coupled to the power source and a plurality of pumps (30) configured to rotate with input shaft (26). Pumps (30) are configured to transfer energy received from the power source into a fluid (22). Transmission apparatus (16) further includes an output device (24) having an output shaft (38) coupled to the work unit and a plurality of turbines (34) configured to rotate output shaft (38). Turbines (34) are configured to remove energy from fluid (22) and transfer said energy to the work unit through output shaft (38).

38 Claims, 20 Drawing Sheets

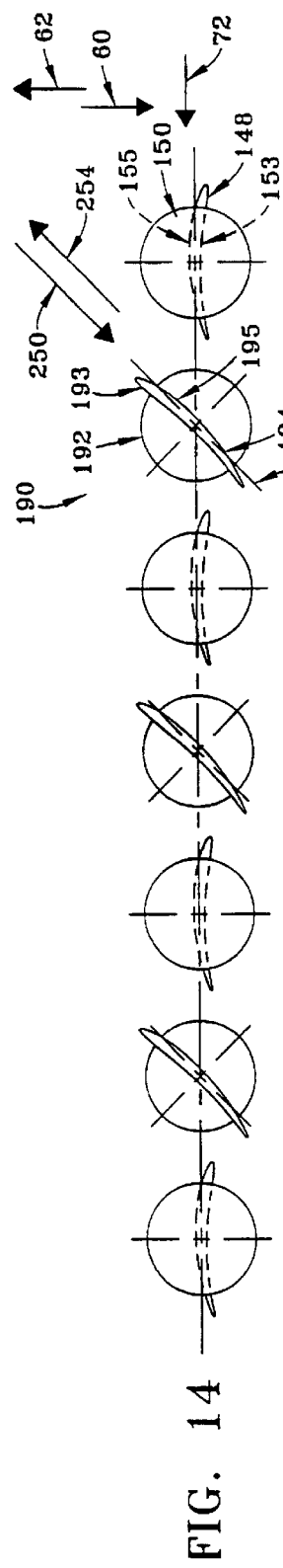
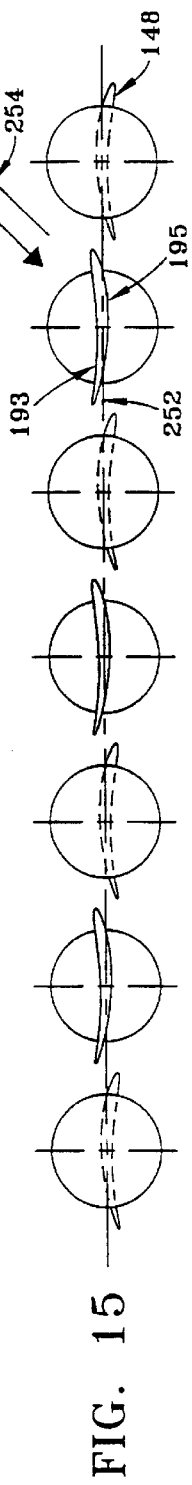
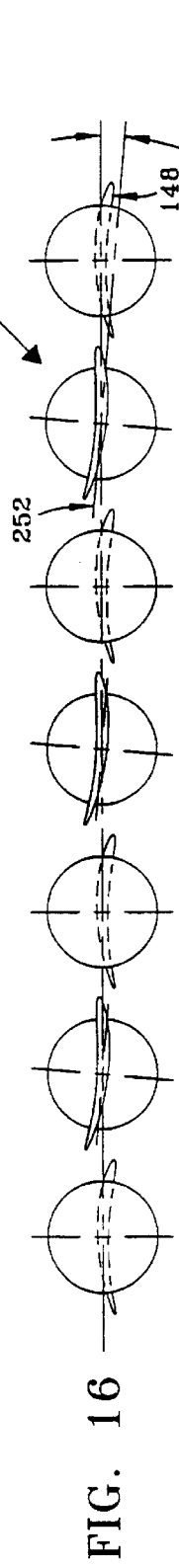
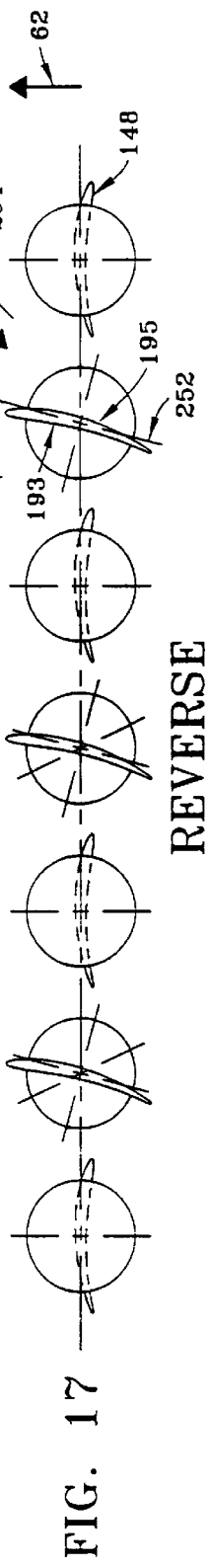
FIG. 14 NEUTRAL
FIG. 15 FORWARD
FIG. 16 OVERDRIVE
FIG. 17 REVERSE

NON-GROUNDED HYDRAULIC TRANSMISSION APPARATUS

BACKGROUND AND SUMMARY OF THE INVENTION

This application is the national phase under 35 U.S.C. § 371 of PCT International Application No. PCT/US00/14054, which has an International filing date of May 22 2000, designates the United States of America, and which claims benefit of U.S. Provisional Application Serial No. 60/135,340 filed May 21, 1999, the disclosure of which is expressly incorporated by reference herein.

The present invention relates to transmission apparatus. More particularly, the present invention relates to hydraulic apparatus having input blades and output blades that introduce and remove energy to a fluid.

Typically, transmission apparatus are provided between a power source and a work unit. Power sources typically convert one type of energy into mechanical energy. For example, an internal combustion engine coverts the energy stored in hydrocarbon fuel to rotational energy. Work units typically use this mechanical energy to perform a useful function. For example, the tires of a vehicle use the rotational energy provided by the engine to propel the remainder of the vehicle.

The transmission apparatus is positioned between the power source and the work unit to convert the output of the power source into a more useable form for the work unit. For example, a vehicle transmission apparatus converts the relatively high rpm and low torque output of an internal combustion engine into a relatively low rpm and high torque input to the tires of a vehicle. This permits the tires to accelerate the vehicle relatively quickly from rest without overloading the available output torque of the engine. Furthermore, this enables coordination of the speed and torque output of the engine with the speed and torque requirements of the tires.

According to the present invention, a transmission apparatus is provided that is configured to transmit energy from a power source to a work unit. The transmission apparatus includes an outer housing defining an interior region containing a fluid, an input shaft, an output shaft, first and second pumps, and first and second turbines.

The input shaft is configured to rotate about a first axis of rotation and is coupled to the power source to receive energy therefrom. The output shaft is configured to rotate about a second axis of rotation and is coupled to the work unit to transmit energy thereto.

The first pump is positioned in the interior region of the outer housing and coupled to rotate with the input shaft to input a first portion of the energy from the power source into the fluid contained in the interior region of the outer housing. The first turbine is positioned in the interior region of the outer housing to receive energy from the fluid contained in the interior region of the outer housing and to transmit said received energy to the output shaft.

The second pump is positioned in the interior region of the outer housing in a position spaced apart from the first pump and coupled to rotate with the input shaft to input a second portion of the energy from the power source into the fluid contained in the interior region of the outer housing. The first turbine is positioned between the first and second pumps.

The second turbine is positioned in the interior region of the outer housing in a position spaced apart from the first turbine to receive energy from the fluid contained in the interior region of the outer housing and to transmit said received energy to the output shaft. The second pump is positioned between the first and second turbines.

According to alternative embodiments of the present invention, each pump includes a set of pump blades and each turbine includes a set of turbine blades. Each set of pump blades is axially spaced apart and each set of turbine blades is axially spaced apart.

According to other alternative embodiments of the present invention, a transmission apparatus is provided that is configured to receive energy from a power source and to transmit a portion of said energy to a work unit. The transmission apparatus includes a first shaft configured to receive power from the power source, a second shaft configured to transmit energy to the work unit, means for adding energy from the first shaft to a fluid to create a flow path, and means for removing energy from the fluid in the flow path. The adding means transfers energy received by the first shaft into the fluid at a first location in the flow path and at a second location in the flow path downstream of the first location in the flow path. The removing means transfers energy from the fluid in the flow path to the second shaft at a third location downstream of the first location and upstream of the second location and at a fourth location downstream of the second location.

According to the present invention, a method for transmitting energy from a power source to a work unit is provided. The method includes the step of providing an input shaft configured to receive power from the power source, a housing having an interior region containing a fluid, and an output shaft configured to transmit power to the work unit. The method further includes the steps of adding energy from the input shaft to the fluid to create a flow path, said addition of energy occurring at a first location in the flow path: removing energy from the fluid at a second location in the flow path downstream of the first location in the flow path: transferring said energy removed from the second location in the flow path to the output shaft; adding energy from the input shaft to the fluid at a third location in the flow path downstream of the second location in the flow path; removing energy from the fluid at a fourth location in the flow path downstream of the third location in the flow path: and transferring said energy removed from the second location in the flow path to the output shaft.

Additional features of the disclosure will become apparent to those skilled in the art upon consideration of the following detailed description when taken in conjunction with the accompanying drawings.

BRIEF DESCRIPTION OF THE DRAWINGS

The detailed description particularly refers to the accompanying figures in which:

FIG. 14 is a view of a row of preferred input and output blades in a neutral position;

FIG. 15 is a view similar to FIG. 14 showing the output blades in a forward position;

FIG. 16 is a view similar to FIG. 14 showing the output blades in an overdrive position;

FIG. 17 is a view similar to FIG. 14 showing the output blades in a reverse position;

DETAILED DESCRIPTION OF THE DRAWINGS

Figure 1:
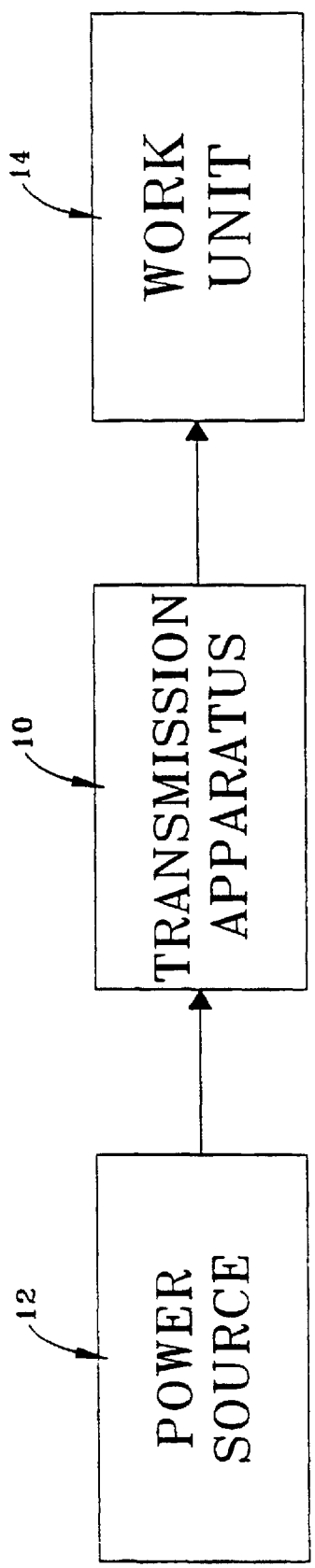
FIG. 1 is a block diagram showing a power source, a transmission apparatus coupled to the power source to receive energy therefrom, and a work unit coupled to the transmission apparatus to receive energy therefrom.

As shown in FIG. 1, a transmission apparatus 10 is coupled to a power source 12 for transmitting energy from power source 12 to a work unit 14, such as vehicle wheels, machinery, generators, or any other device that receives mechanical or other types of energy. Power source 12 is any of a number of devices that converts one type of energy to mechanical energy, such as a combustion engine, an electric motor, or a gas turbine. Transmission apparatus 10 transmits this mechanical energy to work unit 14 in a form that is more useable by work unit 14. For example, power source 12 may be operating at 100 rpm with 10 foot-pounds of torque, while work unit 14 is stationary operating at 0 rpm and requires an increased magnitude of torque to start moving. Thus, transmission apparatus 10 converts the speed and torque of power source 12 into an output that is usable by work unit 14.

Figure 2:
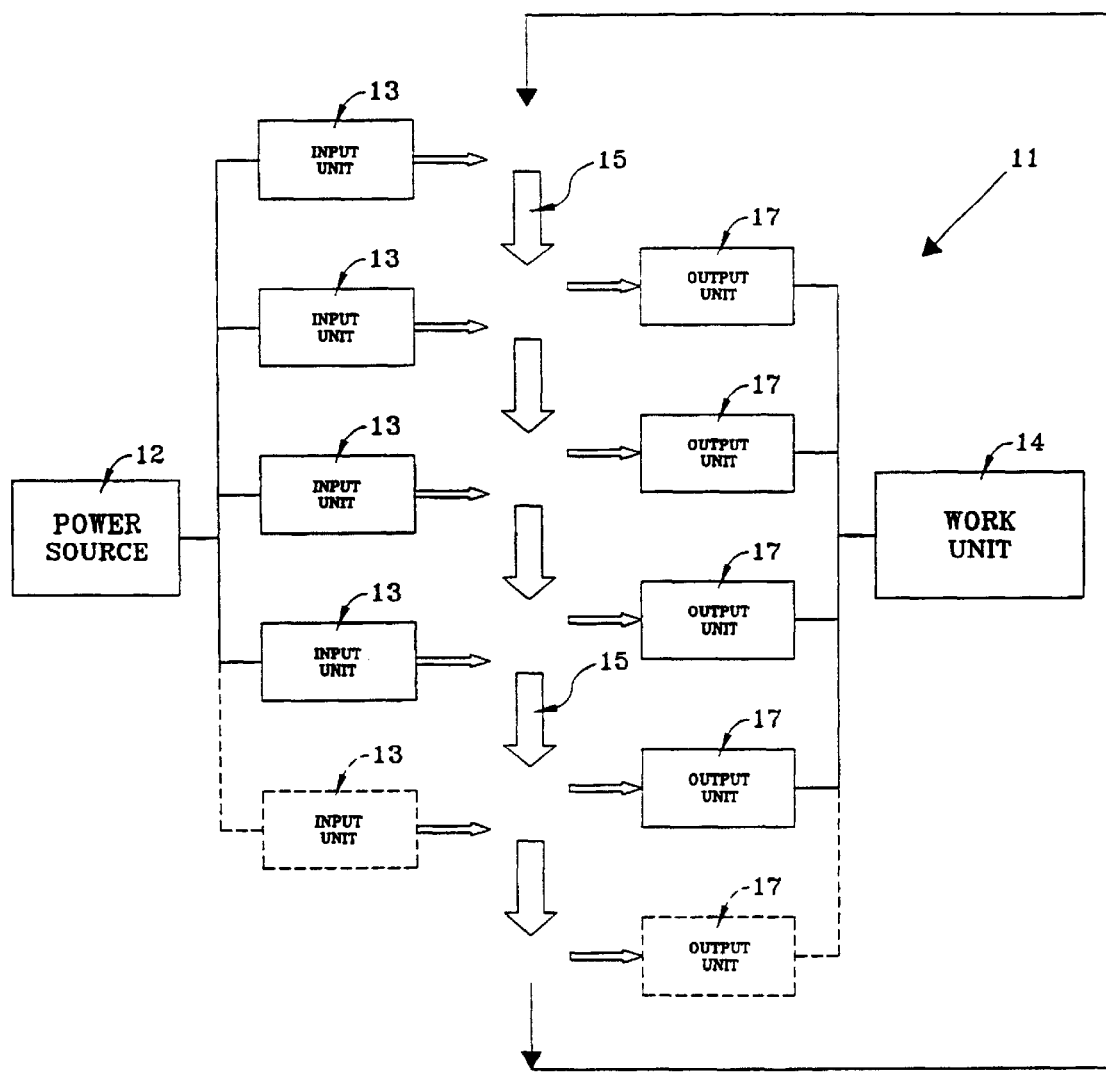
FIG. 2 is a block diagram showing a power source, a work unit, and a transmission apparatus including a plurality of input units coupled to the power source, a plurality of output units coupled to the work unit, and a fluid positioned between the input units and output units, the input units adding energy to the fluid, and the output units removing energy from the fluid and transferring this energy to the work unit.

As shown in FIG. 2, a preferred embodiment hydraulic transmission apparatus 11 is provided between power source 12 and work unit 14. Transmission apparatus 11 includes a plurality of input units 13 coupled to power source 12 to transfer energy into a fluid 15 and a plurality of output units 17 coupled to work unit 14 to transfer energy from fluid 15 to work unit 14. According to alternative embodiments, any number of input and output units are provided. It is believed that the efficiency of the energy exchanged between the input and output units will increase with the increase in the number of input and output units.

Transmission apparatus 11 is configured to cause fluid 15 to travel in a circular path as shown. As fluid 15 travels in the circular path, each input unit 13 adds energy to fluid 15 and each output unit 17 removes energy from fluid 15 that is then transferred to work unit 14. Thus, input and output units 13, 17 sequentially add energy to and remove energy from fluid 15. As shown in FIG. 2, multiple input units 13 add energy to fluid 22 and multiple output units 17 remove energy from fluid 22 during one cycle of fluid 22 through the circular flow path. During this process, transmission apparatus 11 converts the power provided by power source 12 into a more useable form for work unit 14.

According to a preferred aspect of transmission apparatus 11, the characteristics of the energy removed by each output unit 17 is adjustable. For example, each output unit is adjustable to take out less torque than inputted by the associated input unit 13, but at a higher speed. Furthermore, each output unit is adjustable to take out more torque than inputted by the associated input unit 13, but at a lower speed.

The adjustability permits power source 12 to "ramp up" to a normal operating speed without being overwhelmed by the load requirements of work unit 14. Thus, the magnitude of the output is infinitely adjustable to match the output characteristics of power source 12 with the input requirements of work unit 14. Furthermore, the adjustability permits transmission apparatus 11 to coordinate the speed and load output of power source 12 with the speed and load required by work unit 14. Furthermore, the characteristics of the energy added by each input unit 13 is also adjustable. For example, in applications were the output speed should be maintained at a constant rate, such as for combines or generator sets, the input energy characteristics are adjusted to maintain the output speed.

According to an alternative embodiment, the output units adjust the load applied to the power source automatically based on the input energy. For example, if the input units are initially operating at a speed greater than the output units, the output units will initially operate at the slower speed with a greater torque load output. As the output units increase the speed of the work unit, the speed of the output units will increase but at a decreased level of load.

According to another preferred aspect of transmission apparatus 11, the direction of the energy output to work unit 14 can be changed from one direction to another. For example, if power source 12 is producing an output in a clockwise direction, output units 17 are configured to provide input to work unit 14 in both the clockwise direction during one mode of operation and a counterclockwise direction during a second mode of operation.

A preferred embodiment transmission apparatus 16 is shown in FIGS. 3–11. Transmission apparatus 16 includes an outer shell 18, an input device 20 configured to receive rotational energy from a suitable power source such as a combustion engine, a volume of fluid 22 that receives energy from input device 20, and an output device 24 configured to receive energy from fluid 22 and transmit said energy to a suitable work unit, such as the drive wheels of a vehicle. Input device 20 receives power from a power source at an rpm and torque and introduces this energy into fluid 22. Output device 24 removes this energy from fluid 22 to provide power at a useful rpm and torque to the work unit.

According to the presently preferred embodiment, fluid 22 is standard transmission fluid. According to alternative embodiments, fluids having higher or lower viscosities than transmission fluid are used, such as water, oil, kerosene, or air.

Figure 5:
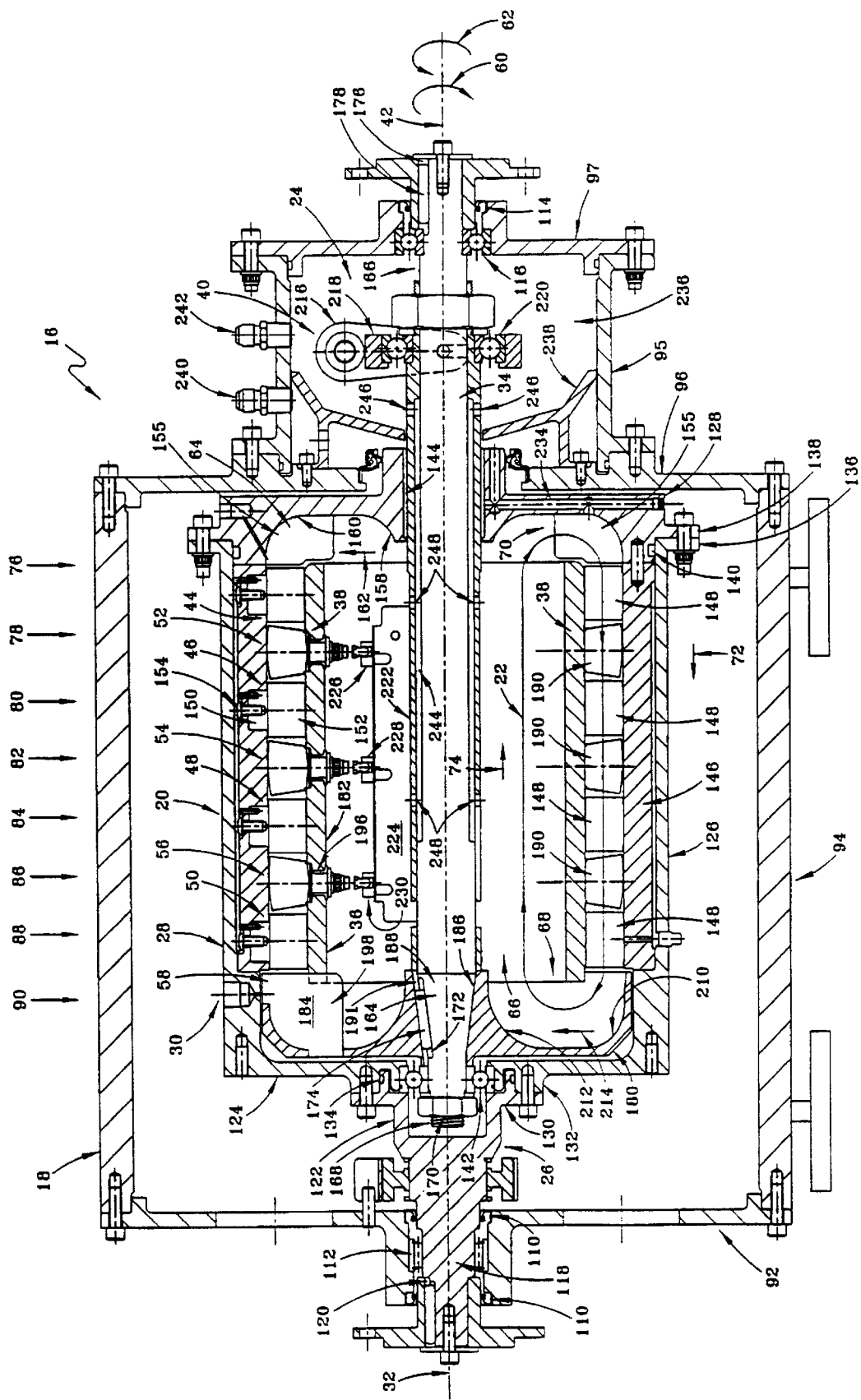
FIG. 5 is a cross-sectional view taken along lines 5—5 of FIG. 3.

As shown in FIG. 5, input device 20 includes an input shaft 26 configured to be coupled to a power source, an outer housing 28 coupled to input shaft 26, and a series of pumps 30 coupled to outer housing 28. Input shaft 26, outer housing 28, and pumps 30 rotate about a first axis of rotation 32 relative to outer shell 18. Torque and speed from the power source are transmitted through input shaft 26 and outer housing 28 to pumps 30 that then introduce the energy into fluid 22. This energy is introduced into fluid 22 by changing the speed and direction of fluid 22 traveling through transmission apparatus 16.

Output device 24 includes an output shaft 34, an inner housing 36 coupled to output shaft 34, a plurality of turbines 38 coupled to inner housing 36, and a turbine adjustment mechanism 40 coupled to turbines 38. Turbines 38 transmit power from fluid 22 to output shaft 34 through inner housing 36. This energy is removed from fluid 22 by changing the speed and direction of fluid 22 traveling through transmission apparatus 16. Thus, power is transmitted from input device 20 to output device 24 through fluid 22.

According to the presently preferred embodiment, series of pumps 30 include first, second, third, and fourth pumps 44, 46, 48, 50 as shown in FIG. 5. Similarly, series of turbines 38 include first, second, third, and fourth turbines 52, 54, 56, 58. When input shaft 26, outer housing 28, and series of pumps 30 rotate in a clockwise direction 60, first, second, third, and fourth pumps 44, 46, 48, 50 transfer energy into fluid 22 so that fluid 22 begins to rotate in clockwise direction 60 as well. This clockwise flow of fluid 22 impinges upon first, second, third, and fourth turbines 52, 54, 56, 58 so that series of turbines 38, inner housing 36, and output shaft 34 rotate either in clockwise direction 60 or a counterclockwise direction 62 depending on the positioning of first, second, third, and fourth turbines 52. 54, 56, 58, as will be discussed in greater detail below.

Each stage of pumps and turbines 30, 38 provides an approximately 2:1 torque ratio. Because there are four stages of pumps and turbines 30, 38, the overall torque ratio of transmission apparatus 16 is approximately 8:1. According to alternative embodiments the transmission apparatus includes fewer or more stages of pumps and turbines to change the torque ratio. For example, heavy equipment such as trucks, tractors, or bulldozers may require five to ten stages of pump and turbine blades or lighter equipment may require only one stage each of pump and turbine blades.

According to alternative embodiments, the output and input blades have either larger or smaller surface areas. By changing the surfaces areas, the torque conversion of each stage is changed. Thus, depending on the particular application, the maximum torque conversion ratio can be designed into the transmission apparatus to match a specific need.

Inner and outer housings 36, 28 cooperate to define an energy exchange passage 64 in which pumps 30 introduce energy into fluid 22 and turbines 38 remove energy from fluid 22. Inner housing 36 defines a return passage 66 that communicates fluid 22 from an outlet 68 of energy exchange passage 64 to an inlet 70 of energy exchange passage 64. Thus, fluid 22 not only flows in clockwise direction 60, but also travels in a first axial direction 72 through energy exchange passage 64 and in a second axial direction 74 through return passage 66 to inlet 70.

As fluid 22 travels through energy exchange passage 64, energy is sequentially added and removed from fluid 22 as it passes through series of pumps 30 and turbines 38. For example, first pump 44 adds energy to fluid 22 at a first axial location 76 in energy exchange passage 64. Then, first turbine 52 removes energy from fluid 22 at a second axial location 78 in energy exchange passage 64. Second pump 46 then replenishes the energy in fluid 22 by adding energy at a third axial location 80 in energy exchange passage that is then removed by second turbine 54 at a fourth axial location 82 in energy exchange passage 64. Similarly, third and fourth pumps 48, 50 add energy to fluid 22 at fifth and seventh axial locations 84, 88, that is subsequently removed by respective third and fourth turbines 56, 58 at sixth and eighth axial locations 86, 90 in energy exchange passage 64. Thus, pumps 30 and turbines 38 sequentially add and remove energy from fluid 22 as fluid 22 travels in first axial direction 72 so that energy is exchanged from input device 20 to output device 24 through fluid 22.

Fourth turbine 58 not only removes energy from fluid 22, but directs fluid 22 into return passage 66. Similarly, first pump 44 not only adds energy to fluid 22, but redirects fluid 22 into energy exchange passage 64 to flow in first axial direction 72. Thus, energy has been added and removed from fluid 22 in multiple locations along the axial flow path in energy exchange path 64 during one cycle of fluid 22 along the circular flow path.

Figure 3:
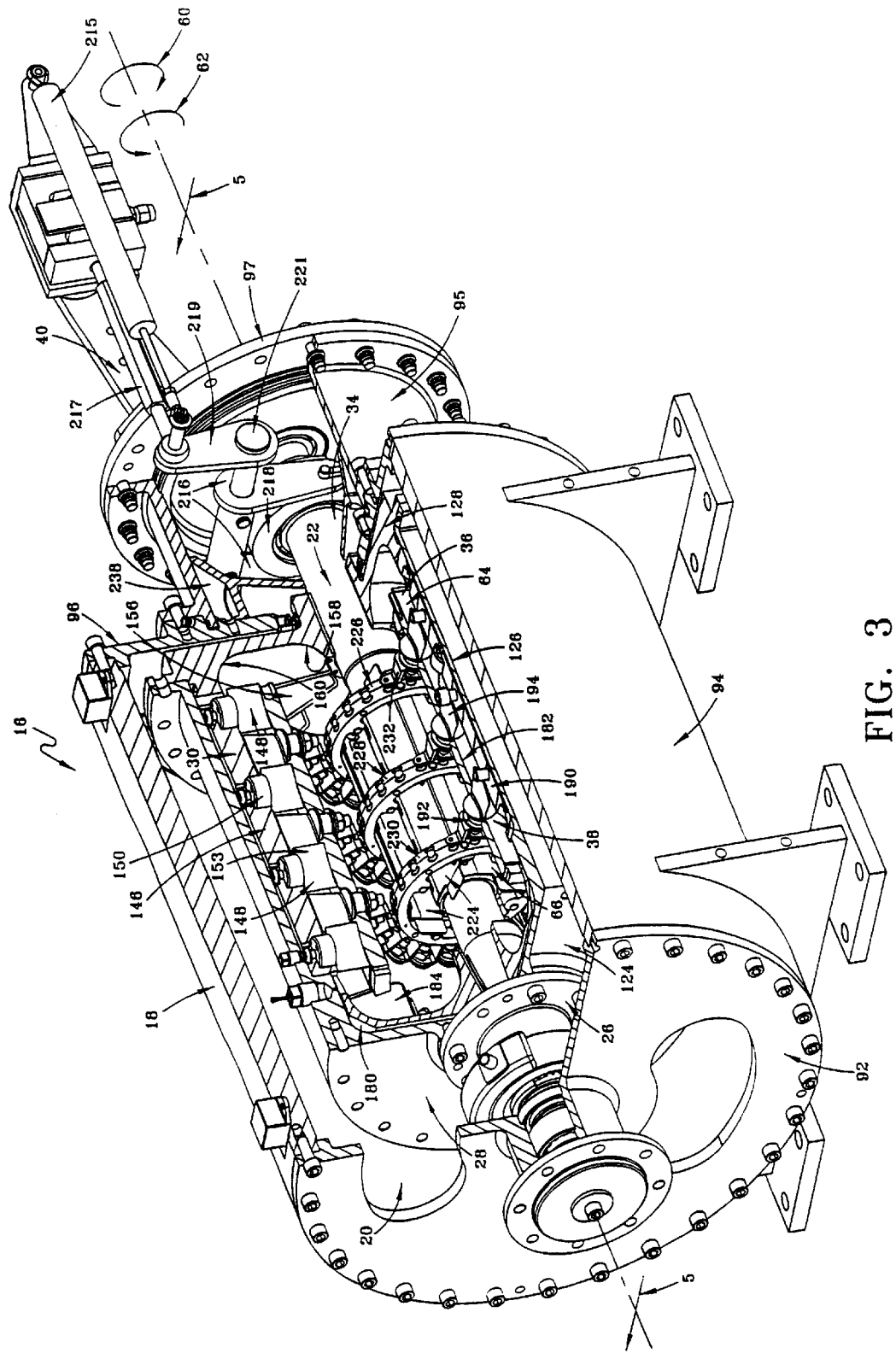
FIG. 3 is a perspective view of a preferred embodiment hydraulic transmission apparatus with portions broken away.
Figure 4:
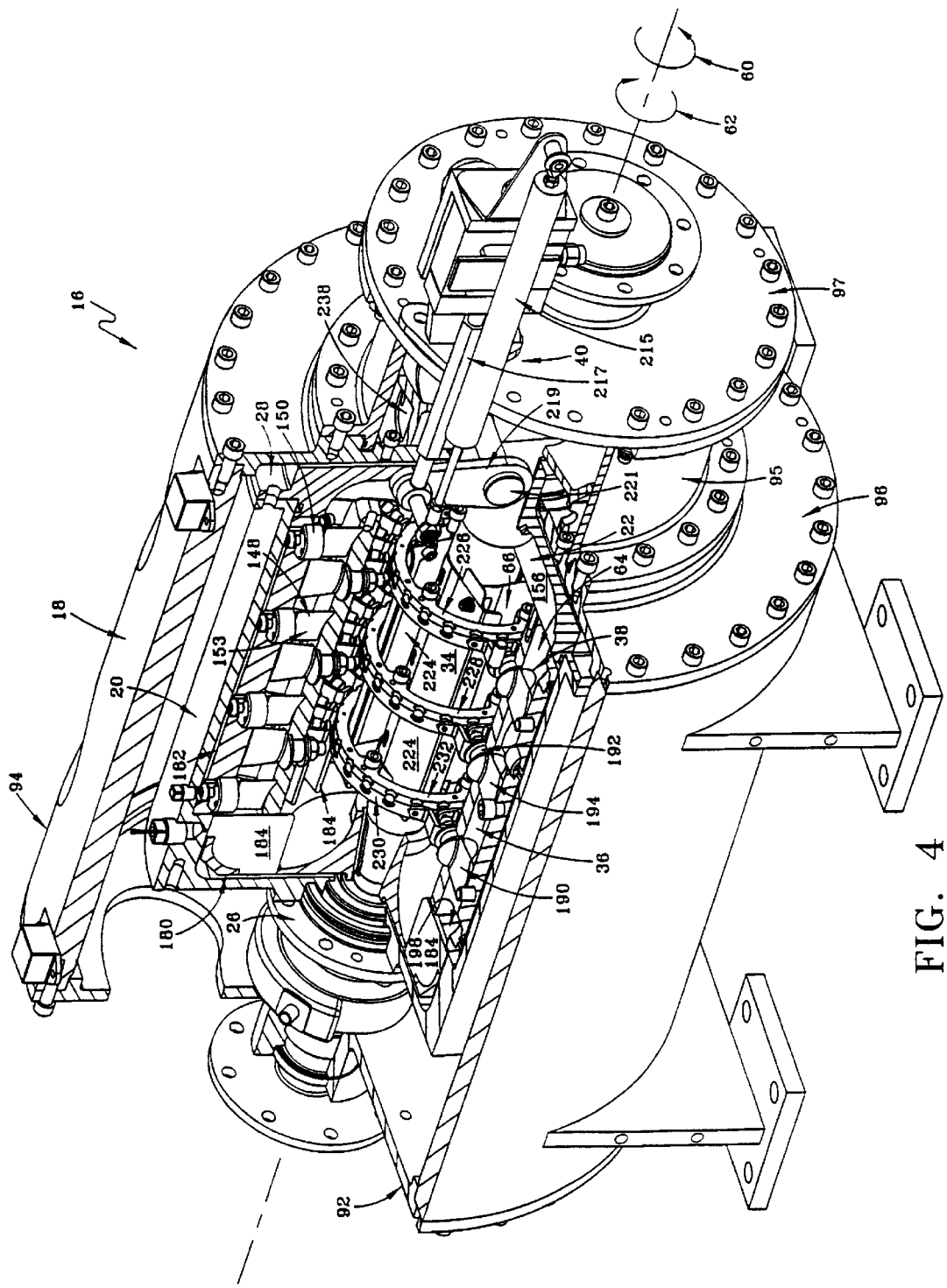
FIG. 4 is a perspective view of the hydraulic transmission apparatus of FIG. 3.

Outer shell 18 is primarily a protective cover that surrounds input and output devices 20, 24. As shown in FIGS. 3–5, outer shell 18 includes an input hub 92, a first cylindrical body 94, an intermediate hub 96, a second cylindrical body 95, and an output hub 97. First cylindrical body 94 is coupled to input and intermediate hubs 92, 96 by suitable fasteners. Similarly, second cylinder body 95 is coupled to intermediate and output hubs 96, 97 by suitable fasteners. Thus, outer housing 18 forms a substantially rigid and stationary member. Therefore, both input and output device 20, 24 rotate relative to housing 18 so that both input or output devices 20, 24 are ungrounded.

As shown in FIG. 5, transmission apparatus 16 further includes a pair of seals 110 positioned between input hub 92 and input shaft 26. Similarly, transmission apparatus 16 includes a roller bearing 112 positioned between input hub 92 and input shaft 26 so that input shaft 26 can rotate relative to outer shell 18 about axis of rotation 32. Transmission apparatus 16 further includes a seal 114 positioned between output hub 97 and output shaft 34. Similarly, transmission apparatus 16 includes a ball bearing 116 positioned between output hub 97 and output shaft 34 to permit output shaft 34 to rotate about axis of rotation 42 relative to outer shell 18.

Transmission apparatus 16 further includes a slip ring assembly 117 for transfer signals from a series of pressure transducers (not shown) positioned in fluid 22. Slip ring assembly is configured to permit electric signals generated by the rotating pressure transducers to a non-rotating signal conditioner (not shown) or other instrumentation located outside of transmission apparatus 16. Thus, transmission apparatus 16 is configured to permit readings of conditions of rotating components, such as the fluid pressure, blade position, strain on components, etc, by non-rotating instrumentation.

Input shaft 26 includes a keyed shank 118 formed to include a keyway 120 for coupling shank 118 to the power source and a hub 122 coupled to shank 118. Shank 118 is positioned adjacent to seals 110 and roller bearing 112, as shown in FIG. 5, to facilitate rotation of input shaft 26 relative to shell 18.

As shown in FIG. 5, outer housing 28 of input device 20 includes a first hub 124, a cylindrical body 126 coupled to first hub 124, a second hub 128 coupled to cylindrical body 126, and a sleeve 146 positioned within cylindrical body 126 that abuts second hub 128. First hub 124 is bolted or otherwise fastened to hub 122 of input shaft 26. Hub 122 of input shaft 26 and first hub 124 of outer housing 28 include complementary formations 130, 132 with an O-ring 134 positioned therebetween providing sealed engagement between hub 122 and first hub 124.

As shown in FIG. 5, cylindrical body 126 is integral with first hub 124. Second hub 128 is bolted or otherwise fastened through a pair of flanges 136, 138 formed in cylindrical body 126 and second hub 128. An O-ring 140 is positioned between cylindrical body 126 and second hub 128 to provide sealed engagement therebetween.

Second hub 128 is formed to include first and second curved surfaces 158, 160 configured to redirect or turn fluid 22 from return passage 66 into energy exchange passage 64. First curved surface 158 is configured to redirect or turn fluid 22 from second axial direction 74 to radially outwardly direction 162. Second curved surface 160 is configured to redirect or turn fluid 22 from radially outward direction 162 into first axial direction 72.

As shown in FIG. 5, output shaft 34 rotates about axis of rotation 42 relative to input shaft 26 and outer housing 28. Transmission apparatus 16 further includes a ball bearing 142 positioned between complementary formation 132 of first hub 124 and output shaft 34 to permit output shaft 34 to rotate relative to outer housing 28 and the remainder of input device 20. Similarly, transmission apparatus 16 includes a journal bearing 144 positioned between second hub 128 of outer housing 28 and a portion of turbine adjustment mechanism 40 to permit outer housing 28 to rotate relative to turbine adjustment mechanism 40 and the remainder of output device 24.

Figure 9:
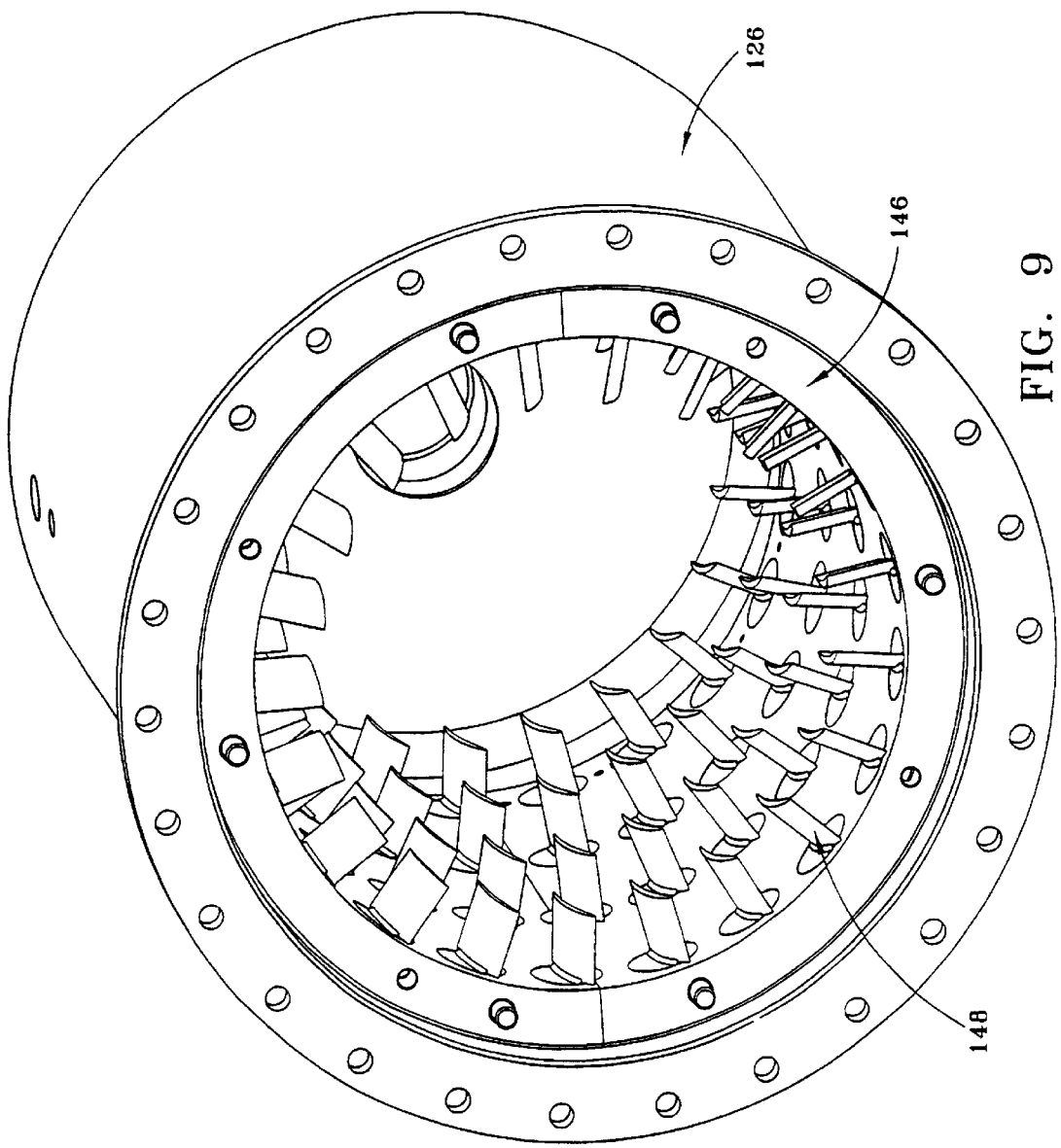
FIG. 9 is a perspective view of several components of the hydraulic transmission apparatus of FIG. 3 showing input blades extending radially inwardly.

First, second, third, and fourth pumps 44, 46, 48, 50 each include a stage of input blades 148 adjustably coupled to sleeve 146 of outer housing 28 as shown in FIGS. 3–5. Each input blade 148 includes a cylindrical base 150 and a vane 152 coupled to cylindrical base 150. According to the presently preferred embodiment, adjustment screws 154 are provided that permit input blades 148 to pivot on sleeve 146 so that the pitch of input blades 148 can be adjusted. According to the presently preferred embodiment, first pump 44 includes twenty-two input blades 148, second pump 46 includes twenty-three input blades 148, third pump 48 includes twenty-two input blades 148, and fourth pump 50 includes twenty-one input blades 148 as shown in FIG. 9.

To adjust the pitch of input blades 148, sleeve 146 and input blades 148 are removed from within cylindrical body 126 and screws 154 are loosened so that input blades 148 can be rotated. Then screws 154 are tightened to fix the position of input blades 148. Sleeve 146 and input blades 148 are then positioned back in cylindrical body 126 for operation of transmission apparatus 16. The pitch of each input blade 148 is approximately the same as the other input blades 148, but according to alternative embodiments, the pitch of the respective input blades are different.

As shown in FIGS. 14–17, preferably, vanes 152 extend radially inwardly and are curved to have a concave surface 153 that "pushes" fluid 22 in clockwise direction 60 and a convex surface 155 opposite concave surface 153. According to alternative embodiments, the surfaces of the vanes are flat. According to other alternative embodiments, the vanes extend in a partial or fully axial direction so that the pumps are partially or fully concentric to one another.

Figure 10:
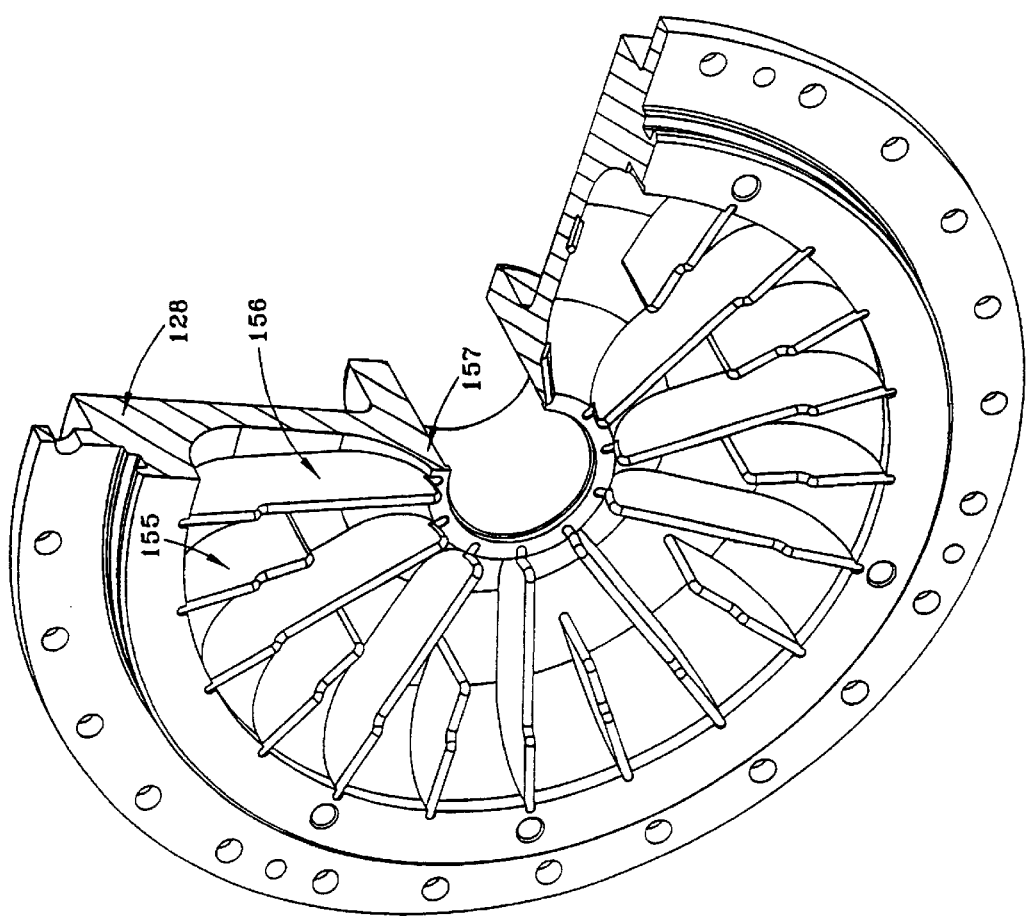
FIG. 10 is a perspective view of a hub of the hydraulic transmission apparatus showing several input blades welded thereto.

As shown in FIG. 5, first pump 44 further includes a set of plate-like input blades 156, 155 welded to second hub 128. As shown in FIG. 10, input blades 156 extends from an inner portion 157 of second hub 128 to an outer portion 159 of second hub 128. Input blades 155 extend from outer portion 159 approximately half way to inner portion 157. According to an alternative embodiment, the plate-like input blades of the first pump and the second hub are cast into a single component. Preferably, input blades 156 extend parallel to fixed axial direction 72. According to alternative embodiments, these input blades extend in a non-parallel direction to create additional axial movement in the fluid. According to the presently preferred embodiment, first pump 44 includes twenty-two plate-like input blades 156. For clarity, several input blades, output blades, other components are not illustrated in FIG. 5.

Output shaft 34 includes a first end 164 and a second end 166 spaced apart from first end 164. First end 164 includes a threaded portion 168 on which a nut 170 is positioned to retain ball bearing 142 on output shaft 34 and a tapered portion 188. First end 164 further includes a keyway 172 configured to retain a key 174 to rotationally lock output shaft 34 to inner housing 36. Second end 166 is also formed to include a keyway 176 sized to receive a key 178 to lock output shaft 34 to a preferred work unit.

As shown in FIG. 5, inner housing 36 includes a hub 180 and a cylindrical body 182 coupled to hub 180 by a plurality of plate-like blades 184. Hub 180 includes a tapered portion 186 that complements tapered portion 188 of output shaft 34 and a keyway 191 sized to receive key 178.

As shown in FIG. 5, hub 180 includes a pair of curved surfaces 210, 212 configured to redirect or turn fluid 22 from travel in first axial direction 72 to second axial direction 74. First curved surface 210 directs fluid 22 from first axial direction 72 to a radially inward direction 214. Second curved surface 212 directs fluid 22 from radially inward direction 214 to second axial direction 74. Thus, as described earlier, fluid 22 travels in a closed circular path from energy exchange passage 64 to return passage 66 back to energy exchange passage 64.

Figure 6:
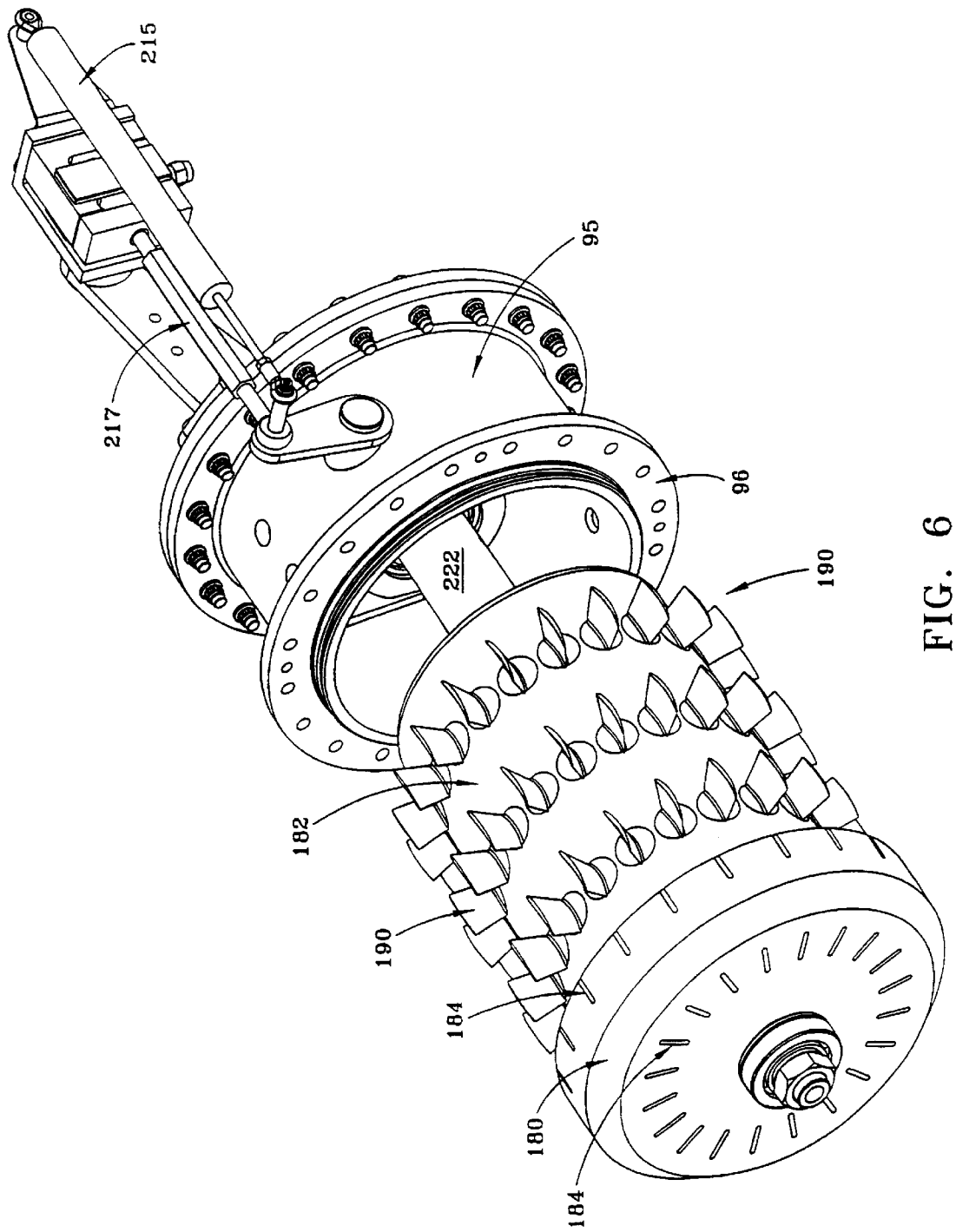
FIG. 6 is a perspective view of the hydraulic transmission apparatus of FIG. 3, with several components removed, showing output blades extending radially outwardly.
Figure 7:
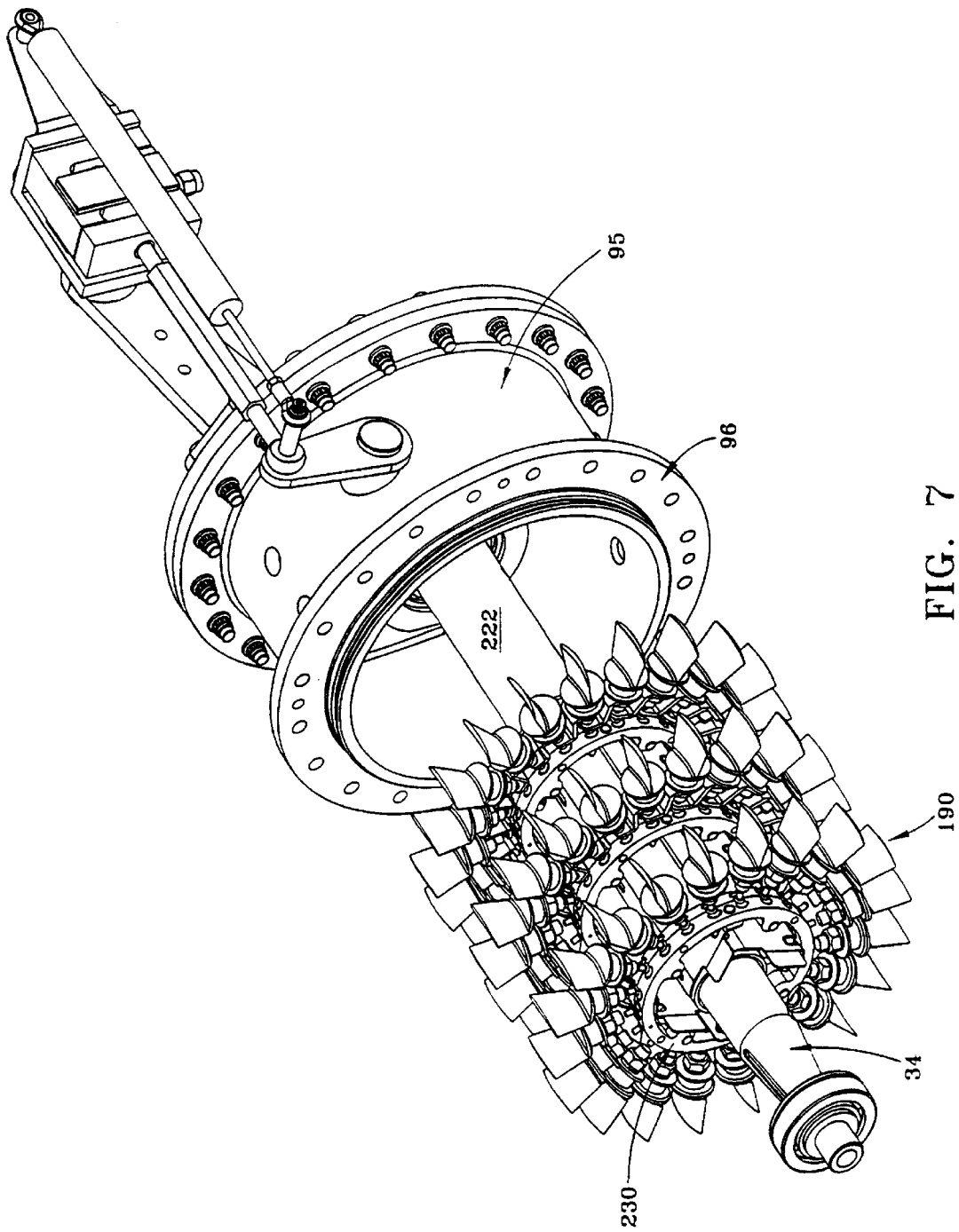
FIG. 7 is a perspective view of the hydraulic transmission apparatus of FIG. 3, with several components removed, showing an actuation mechanism coupled to the output blades.
Figure 8:
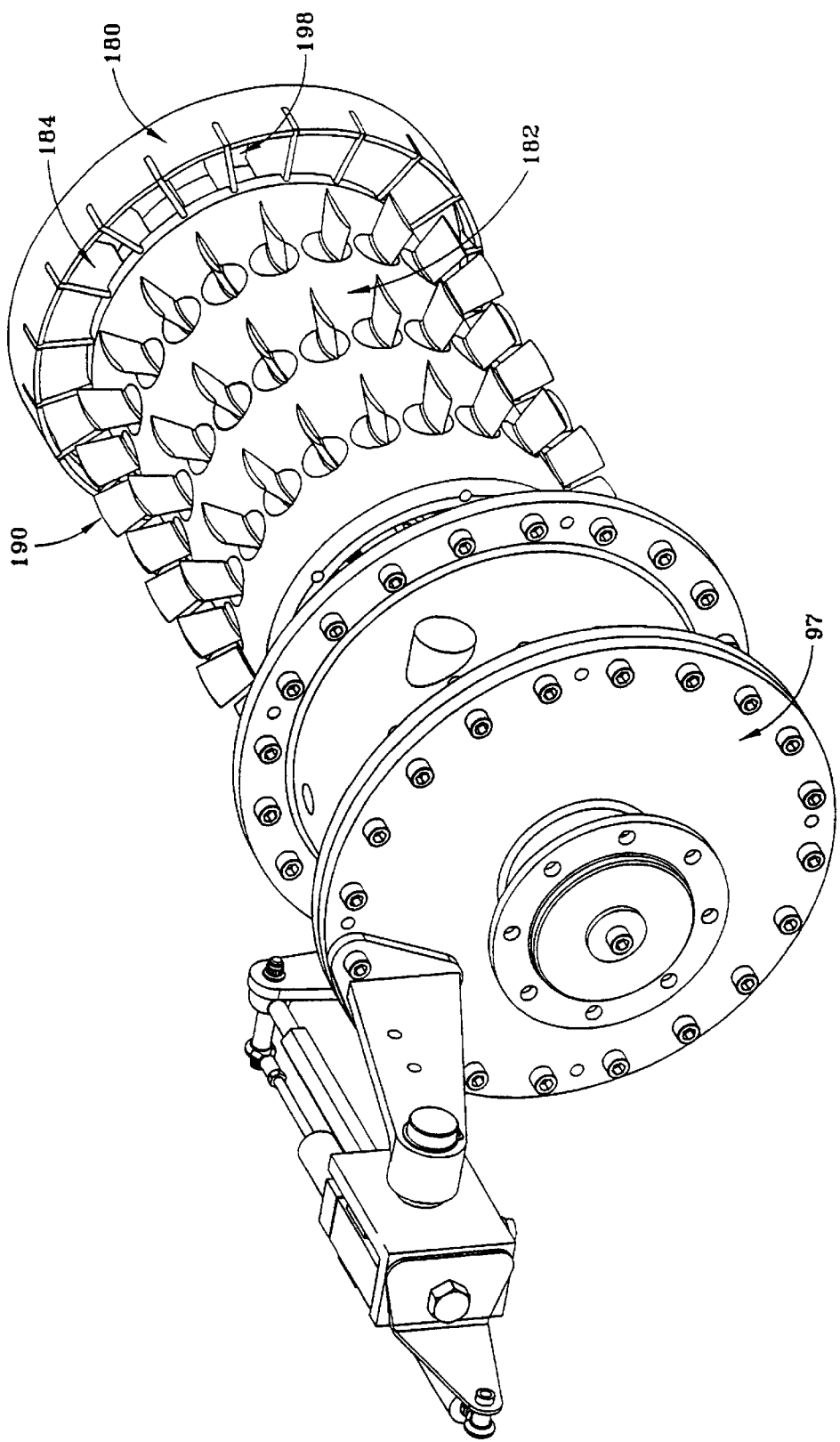
FIG. 8 is a perspective view similar to FIG. 6.

First, second, and third turbines 52, 54, 56 each include a stage of output blades 190. Each output blade 190 includes a cylindrical base 192 and a vane 194. Cylindrical body 182 of inner housing 36 includes a plurality of apertures 196 configured to receive cylindrical base 192 of output blades 190 so that output blades 190 can rotate about radial axes relative to cylindrical body 182. As will be discussed in greater detail below, turbine adjustment mechanism 40 is coupled to each cylindrical base 192 so that the pitch of vanes 194 is adjustable. According to the presently preferred embodiment, the pitch of each output blade 190 is approximately the same as the other output blades 190. According to alternative embodiments, the pitch of the respective output blades are different. According to the presently preferred embodiment, first, second, and third turbines 52, 54, 56 each include twenty output blades 190 as shown in FIGS. 6–8.

Preferably, vanes 194 extend radially outwardly and are curved to have a concave surface 193 that "scoops" fluid 22-and a convex surface 195 opposite concave surface 193 as shown in FIG. 15. According to alternative embodiments, the surfaces of the vanes are flat. According to other alternative embodiments, the vanes of the output blades extend in a partial or fully axial direction so that the turbines are partially or fully concentric to one another.

Figure 11:
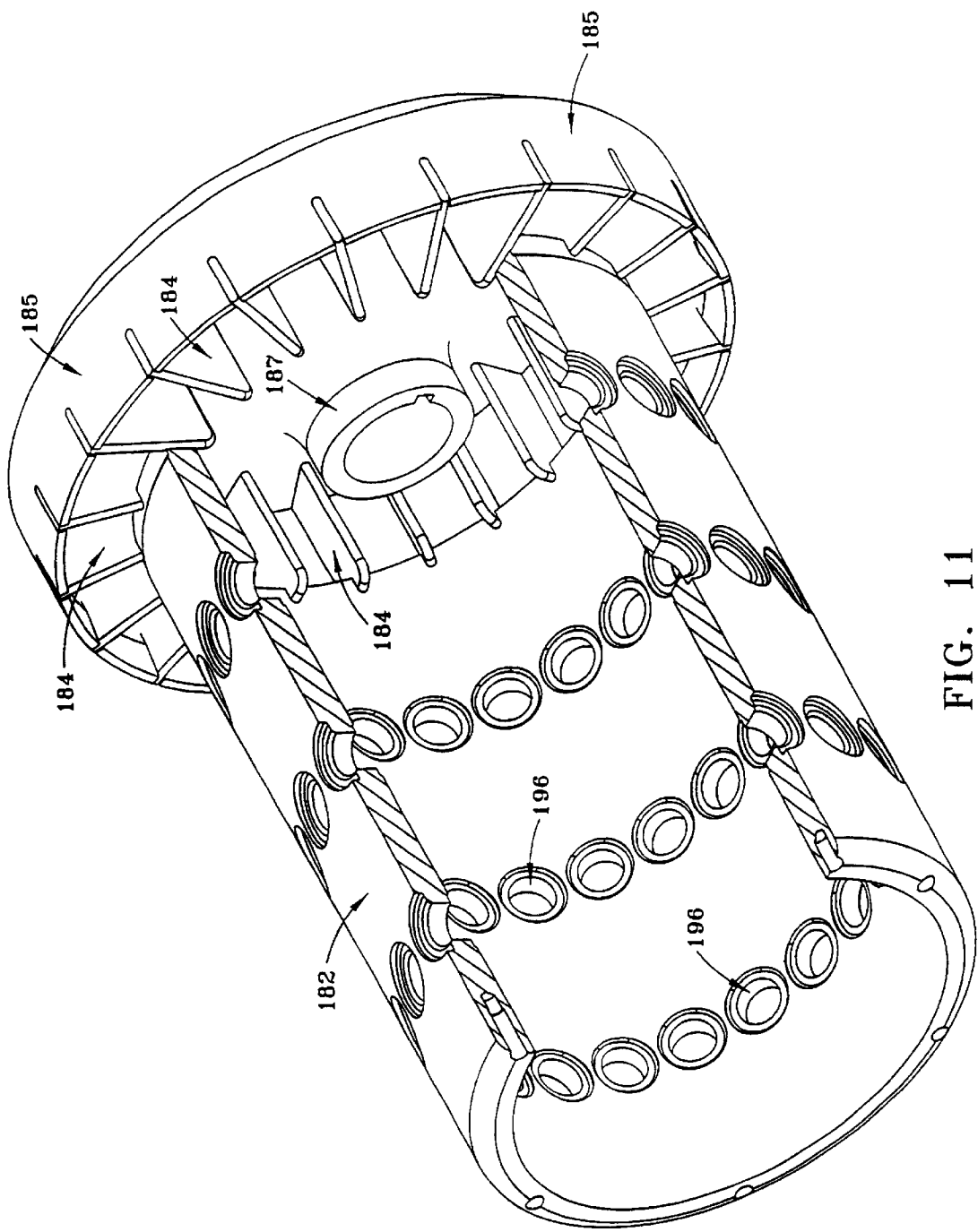
FIG. 11 is a perspective view of another hub of the hydraulic transmission apparatus showing several output blades welded thereto.

Fourth turbine 58 includes plurality of plate-like blades 184 that are welded to cylindrical body 182 and hub 180. Each adjacent pair of plate-like blades 184 cooperates to define a space 198 therebetween defining outlet 68 of energy exchange passage 64. As shown in FIG. 11, each output blade 184 extends from an outer portion 185 of hub 180 half way to an inner portion 187 of hub 180. According to an alternative embodiment, the plate-like blades of the fourth turbine, the cylindrical body of the output housing, and the hub of the output housing are cast as a single component. According to the presently preferred embodiment, fourth turbine 58 includes twenty plate-like output blades 184.

As shown in FIG. 5, turbine adjustment mechanism 40 includes an actuation lever 216, a ring 218 coupled to actuation lever 216, a ball bearing 220 coupled to ring 218, a sheath 222 rotatably coupled to ball bearing 220, four transfer plates 224 coupled to sheath 222, first, second, and third transfer rings 226, 228, 230, and a plurality of crank arms 232 coupled to first, second and third transfer rings 226, 228, 230 and cylindrical bases 192 of output blades 190. Sheath 222 includes a threaded end 223 having a nut 225 coupled thereto to secure ball bearing 220 to sheath 222.

The pitch of output blades 190 is adjusted by rotating actuation lever 216 with a turnbuckle or other actuator 217 through another lever 219 and shaft 221. When actuated by actuator 217, actuation lever 216 pushes ring 218, ball bearing 220, sheath 222, transfer plates 224, and transfer rings 226, 228, 230 in either first or second axial directions 72, 74. Because crank arms 232 are offset from the center of cylindrical base 192 of output blades 190, the axial movement of transfer rings 226, 228, 230 causes crank arms 232 to rotate output blades 190. To change the pitch back, actuation lever 226 is rotated in the other direction by actuator 217. According to the presently preferred embodiment, output blades 190 are configured to rotate 170°. According to alternative embodiments, the actuator is a motor driven, pneumatic, or any other type actuator. A sensor 215 is also provided to detect the degree of actuation of actuator 217.

During operation of transmission apparatus 16, sheath 222, transfer plates 224, transfer rings 226, 228, 230 and crank arms 232 rotate with output shaft 34, inner housing 36, and turbine 38. However, ring 228 and actuation lever 226 remain stationary with outer shell 18. Ball bearing 220 permits this relative motion and transfers the axial movement between ring 218 and sheath 222. According to an alternative embodiment transmission apparatus, a shield is positioned between the output shaft and the cranks arm to reduce the drag in the fluid return passage. According to alternative embodiments, the input and output blades are fixed.

Transmission apparatus 16 is configured to permit filtering and cooling of fluid 22. As shown in FIG. 5, sheath 222 and output shaft 34 cooperate to define a passage 244 therebetween. Sheath 222 is formed to includes four inlet apertures 248 and a pair of outlet apertures 246. Fluid 22 from return passage 66 enters inlet apertures 248 and exits into an interior region 236 of second cylindrical body 95. Fluid 22 then flows to a connector 242 coupled to second cylindrical body 95. A filter (not shown) and storage tank (not shown) are coupled to connector 242 to remove impurities from fluid 22. According to alternative embodiments, a radiator or other fluid cooling device is coupled to the connector to maintain the fluid below a predetermined temperature.

Fluid 22 is returned to transmission 16 through another connector 240 coupled to second cylinder body 95. Transmission apparatus 16 includes a baffle 238 configured to redirect or turn fluid 22 from connector to a fluid passage 234 formed in second hub 128 of outer housing 28. Fluid 22 is communicated through baffle 238 into fluid passage 234 where it exits into energy exchange passage 64.

Before starting preferred power source, such as an engine, fluid 22 is not moving. When the engine starts, input blades 148 begin to rotate fluid 22 in clockwise direction 60 and pushes fluid 22 in first axial direction 72. This input of energy into fluid 22 creates momentum or working pressure in fluid 22 creating a high g field near the outer tips of output blades 190. During and after creation of the working pressure, input blades 148 add to the overall momentum of fluid 22. Output blades 190 remove portions of this momentum for transfer to output shaft 34 and the associated work unit.

As previously mentioned, a circular flow of fluid 22 is created in which fluid 22 travels through energy exchange passage 64, turns into return passage 66, travels through return passage 66, and turns back into energy exchange passage 64. During travel through energy exchange passage 64, multiple stages of input blades 148 and output blades 190 sequentially add and remove energy from fluid 22. Thus multiple stages of input and output blades 148, 190 exchange energy before fluid 22 is turned into return passage 66. It is believed that this arrangement increases the efficiency of energy exchange between input and output devices 20, 24.

Figure 13:
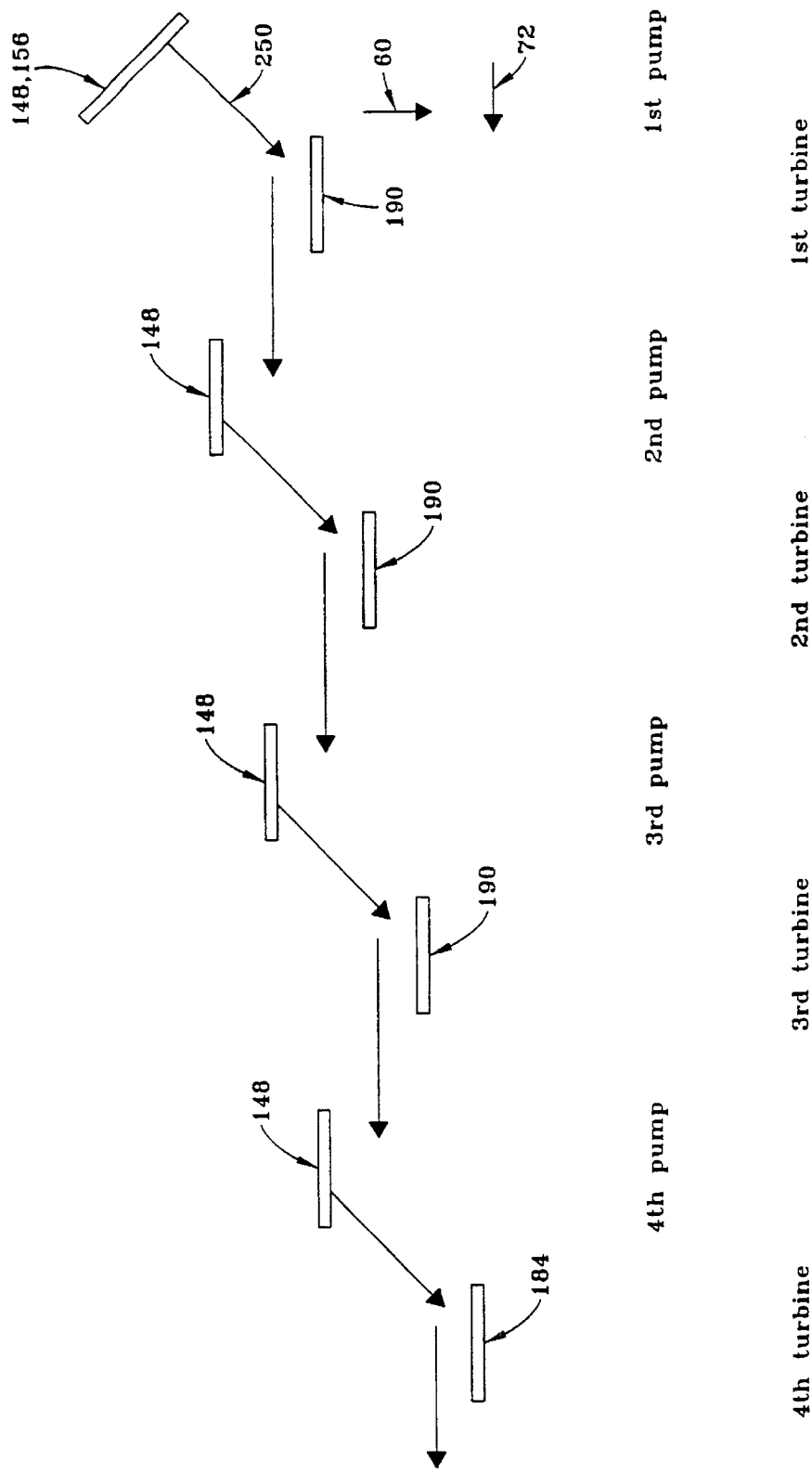
FIG. 13 is a block diagram showing pump blades adding energy to a fluid and turbine blades removing energy from the fluid.

Plate-like blades 156 and input blades 148 of first pump 44 cooperate to cause fluid 22 to flow in both clockwise direction 60 and in first axial direction 72. This flow is illustrated in FIG. 13 showing fluid 22 traveling in direction 250 having both components in clockwise direction 60 and first axial direction 72. Fluid 22 then impinges on output blades 190 of first turbine 52 that turns fluid 22 so that the clockwise component of the fluid flow is reduced. Input blades 148 of second pump 46 then replenishes the clockwise component of fluid 22 so that fluid 22 impinges on output blades 190 of second turbine 54. This process repeats until fluid 22 is directed to return passage 66. For simplicity, fluid 22 is shown exiting pumps 30 in direction 250 for all modes of operation. However, it is believed that the direction of fluid flow will change for each mode of actual operation.

As fluid 22 circulates through transmission apparatus 16, pumps and turbines 30, 38 sequentially add and remove energy from fluid 22. Pumps 30 add energy by increasing the clockwise component of the flow and turbines 38 remove energy by decreasing the clockwise component of the flow. For example, as fluid 22 enters inlet 70 of energy exchange passage 64, fluid 22 is flowing at a clockwise speed that is less than the clockwise speed of input blades 148. Thus, input blades 148 release energy into fluid 22 by increasing the clockwise speed of fluid 22. As fluid 22 moves in first axial direction 72, resistance of output blades 190 against the flow of fluid 22 (due to acceleration of the vehicle, wind drag on the vehicle, or other frictional loses) "turns" fluid 22 to remove energy from fluid 22 to decrease the clockwise speed of the flow. Because of this decrease in clockwise speed, fluid 22 has a clockwise speed less than input blades 148 so that second pump 46 again increases the clockwise speed of fluid 22. Similarly, second, third, and fourth turbines 54, 56, 58 remove energy by slowing the clockwise speed of fluid 22 that is then replenished by energy input by third, fourth, and first pumps 48, 50, 44.

Thus, as fluid 22 leaves a turbine 52, 54, 56, 58, it is traveling at a clockwise speed that is less than the clockwise speed of pumps 44, 46, 48, 50. As the fluid travels through a pump 44, 46, 48, 50, input blades 142 increase the clockwise component of the fluid flow. The next turbine 52, 54, 56, 58 then reduces the clockwise speed which is replenished by next pump 46, 48, 50, 44.

During "cruise" operation, output blades 190 remove approximately as much speed from fluid 22 as input blades 148 add. Thus, input shaft 26 and output shaft 34 rotate at approximately the same speed. Because of axial, drag, and bearing friction losses, output shaft 34 has a slightly lower output horsepower than input shaft 26.

As previously mentioned, output blades 190 are adjustable to permit changing the pitch or angle at which fluid 22 impinges on output blades 190. By changing the pitch of output blades 190 relative to the flow of fluid 22, the speed and direction of flow of output blades 190 are controlled. Thus transmission apparatus 16 can be "shifted" between neutral, forward, and reverse modes. According to an alternative embodiment, the output blades are fixed and a gear box including neutral, forward, and reverse gears is provided.

As shown in FIG. 14, output blades 190 are in a neutral position with a chord 252 of output blades 190 pointing in a direction slightly counterclockwise of a direction 254 opposite direction 250. Under a situation with no drag, chord 252 would be pointed directly in direction 254. Because chord 252 of output blades 190 would be pointed directly into the flow of fluid 22, it would create little or no normal forces on output blades 190 so that output blades 190 would have no tendency to rotate. However, because friction in the form of drag does normally exist, the flow of fluid 22 over surfaces 193, 195 of output blades 190 creates a small amount of drag that pushes on output blades 190 in clockwise direction 60. To compensate for this drag, chords 252 are positioned in the direction slightly counterclockwise of direction 254 to create a slight force in counterclockwise direction 62 on output blades 190 to compensate for the drag in clockwise direction 60. According to the preferred embodiment, the chords are shifted 5° counterclockwise of direction 254.

To cause the vehicle to move forward, output blades 190 are moved to a forward position shown in FIG. 15 with chord 252 of each output blade 190 pointing in a direction clockwise of direction 254. Because surface 193 of output blades 190 is facing into direction of the flow of fluid 22, normal forces are created on output blades 190 in clockwise direction 60 and first axial direction 72. Because output blades 190 are free to rotate about axis of rotation 42, output blades 190, inner housing 36, and output shaft 34 also rotate in clockwise direction 60 causing the vehicle to move forward. The drag over output blades 190 also pushes on output blades 190 to create push in clockwise direction 60 that contributes to the rotation of output shaft 34.

Transmission apparatus 16 is configured to provide for an overdrive mode wherein output shaft 34 rotates at a higher speed with a lower torque than input shaft 26. As previously mentioned, output blades 190 turn fluid 22 to reduce the speed of the clockwise movement of fluid 22. Output blades 190 can be rotated so as to increase the amount of turn that each output blade 190 removes from the flow of fluid 22. This increase in turn removal results in output blades 190 rotating at a faster rate than input blades 148. Because output blades 190 are removing more clockwise movement from fluid 22, input blades 148 must apply more input torque to re-accelerate fluid 22 in clockwise direction 60. Thus, output shaft 34 rotates at a faster speed than input shaft 26, but at a lower torque.

To cause the vehicle to move in reverse, output blades 190 are moved to a reverse position shown in FIG. 17 with chord 252 of each output blade 190 pointing in a direction counterclockwise of direction 254. Because surface 195 of output blades 190 is facing into the direction of the flow of fluid 22, normal forces are created on output blades 190 in counterclockwise direction 62 and first axial direction 72. Because output blades 190 are free to rotate about axis of rotation 42, output blades 190, inner housing 36, and output shaft 34 also rotate in counterclockwise direction 62 opposite clockwise direction 60 of input blades 148 causing the vehicle to move in reverse.

Transmission apparatus 16 is also configured to operate with output device 24 added energy to fluid 22 and input device 20 removing energy from fluid 22. For example, if output shaft 34 is driven, blades 190 add energy to fluid 22 that is then removed from fluid 22 by blades 148 and transferred to shaft 26. Thus, stages of blades 190 define pumps and stages of blades 148 define turbines. Furthermore, the characteristics of the input energy can be changed by using actuation mechanism 40 to control the output torque or speed at a specific level.

According to alternative embodiments of present disclosure, transmission apparatus 16 and the other transmission apparatus of the present disclosure are provided with a controller (not shown) coupled to a powered actuator and the power source. The controller is configured to control the position of output blades 190 according to the output of the power source. For example, five modes of operation are currently provided: efficiency mode, max acceleration mode, coasting mode, engine-braking mode, and power-braking mode.

Figure 12:
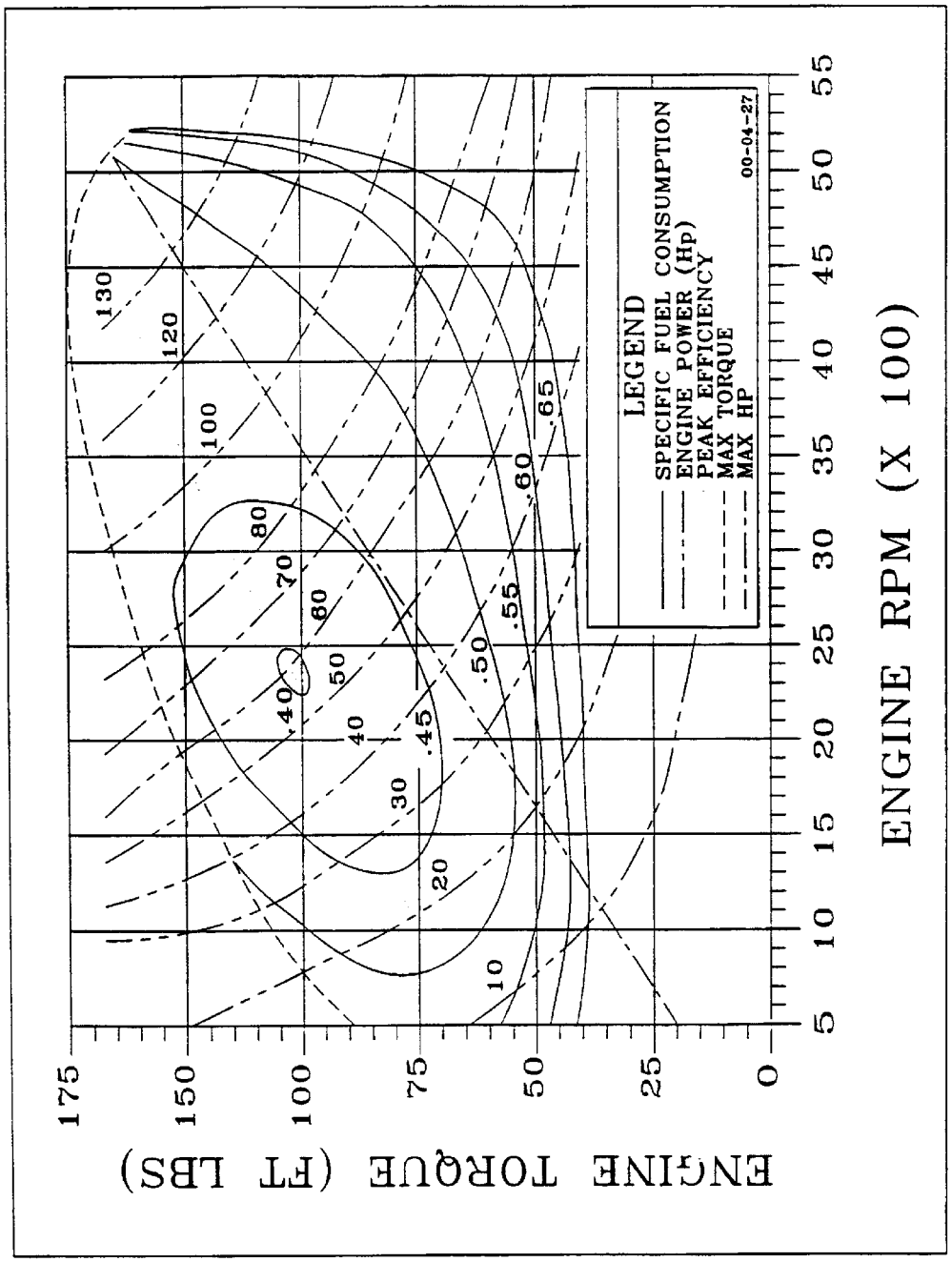
FIG. 12 is a graph depicting engine performance characteristics for an illustrative engine.

During efficiency mode, the controller positions output blades 190 so that the torque load on the power unit matches the torque output of the power unit at the specific operating speed. For example, as shown in FIG. 12, a typical engine has a peak efficiency speed-torque curve 258. Operation of the engine at speed-torque positions other than on peak efficiency curve 258 will lower the vehicle fuel economy.

To accelerate the vehicle at the most efficient rate, the engine speed should be increased along peak efficiency curve 258. To operate along peak efficiency curve 258, the load applied to the engine should match the ideal torque output of the engine at the specific speed. Thus, the controller is configured to vary the pitch of output blades 190 to control the torque load applied to the engine by transmission apparatus 16. Thus, as the engine's output speed increases, the controller increases the torque load of the transmission apparatus on the engine to match the engine's peak efficiency curve 258.

During max acceleration mode, the engine is run above peak efficiency curve 258 to provide more horsepower at the particular engine operating speed, but at a lower fuel efficiency. Because the engine is producing more horsepower, the vehicle will accelerate at a greater rate. The controller is configured to adjust the pitch of output blades 190 to match the torque load applied by the transmission apparatus to the higher output of the engine.

During coasting mode, the user backs off the engine slightly so that the engine is providing slightly less horsepower than is required to maintain the speed of the vehicle. The controller positions output blades 190 at a position so that momentum of the vehicle drives the engine. Frictional losses in the engine and the remainder of the vehicle counter the momentum of the vehicle. However, because the engine is contributing some power to overcome a portion of these frictional losses, the vehicle slows at a gradual pace.

During engine-braking mode, the user backs off the engine completely so that the engine is providing no power. The controller positions output blades 190 at a position so that the momentum of the vehicle drives the pistons of the engine at a significantly high speed. Significant energy is required to overcome the frictional losses in the engine and the remainder of the vehicle. Because the engine is contributing no horsepower to overcome these frictional losses, the momentum of the vehicle is drained at a higher rate than during the coasting mode.

During the power-braking mode, the engine is powered to contribute horsepower to slow the vehicle. The controller positions output blades 190 in the reverse position as shown in FIG. 17. Input blades 148 create a flow of fluid 22 in energy exchange passage 64 that creates a force on output blades 190 in counterclockwise or reverse direction 62. This force in reverse direction 62 acts against the momentum of the vehicle to decelerate the vehicle. Thus, transmission apparatus 16 is configured to permit the engine to contribute engine power to the braking of the vehicle. Such an application is useful in preventing large tractor-trailer trucks from reaching dangerous speeds when traveling down steep grades without overheating the brakes of the truck.

Another preferred embodiment transmission apparatus 416 is shown in FIGS. 19–23. Transmission apparatus 416 includes an outer shell 418, an input device 420 configured to receive rotational energy from a suitable power source such as a combustion engine, a volume of fluid 422 that receives energy from input device 420, and an output device 424 configured to receive energy from fluid 422 and transmit said energy to a suitable work unit, such as the drive wheels of a vehicle. Input device 420 receives power from a power source at an rpm and torque and introduces this energy into fluid 422. Output device 424 removes this energy from fluid 422 to provide power at a useful rpm and torque to the work unit.

According to the presently preferred embodiment, fluid 422 is standard transmission fluid. According to alternative embodiments, fluids having higher or lower viscosities than transmission fluid are used, such as water, oil, or kerosene.

Figure 21:
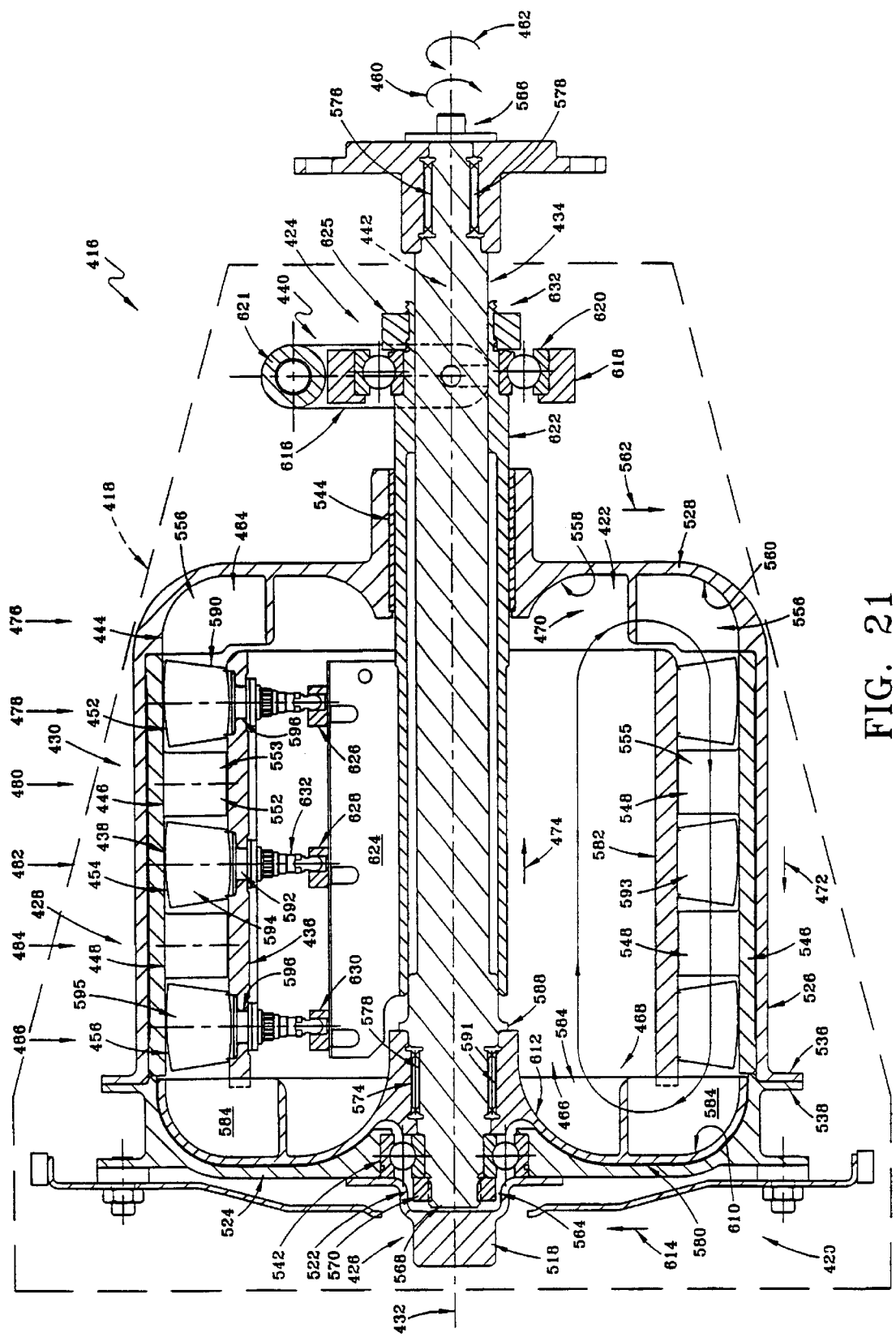
FIG. 21 is a cross-sectional view taken along lines 21—21 of FIG. 19.
Figure 22:
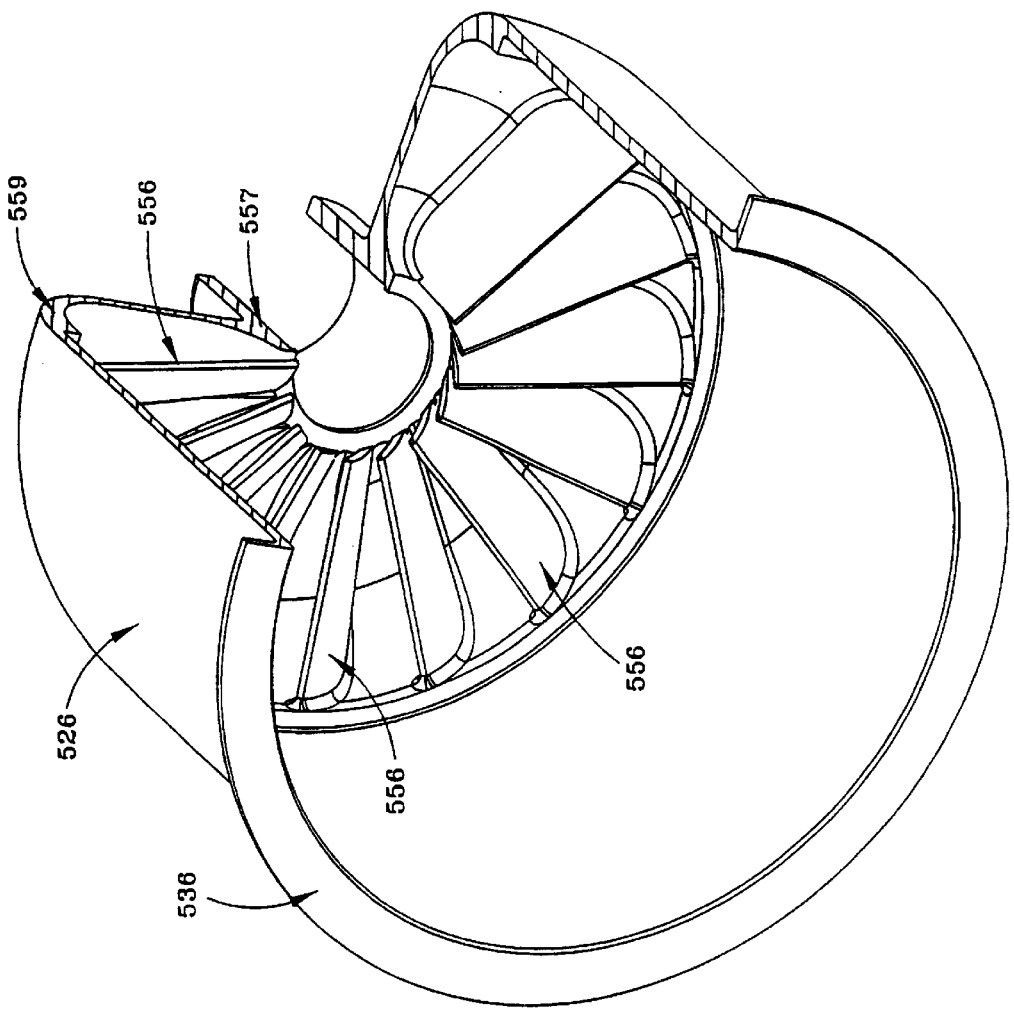
FIG. 22 is a perspective view of a hub of the hydraulic transmission apparatus of FIG. 19 showing several input blades coupled thereto.

As shown in FIG. 21, input device 420 includes an input shaft 426 is configured to be coupled to a power source, an outer housing 428 coupled to input shaft 426, and a series of pumps 430 coupled to outer housing 428. Input shaft 426, outer housing 428, and pumps 430 rotate about a first axis of rotation 432 relative to outer shell 418. Torque and speed from the power source are transmitted through input shaft 426 and outer housing 428 to pumps 430 that then introduce the energy into fluid 422. This energy is introduced into fluid 422 by changing the speed and direction of fluid 422 traveling through transmission apparatus 416.

Output device 424 includes an output shaft 434, an inner housing 436 coupled to output shaft 434, a plurality of turbines 438 coupled to inner housing 436, and a turbine adjustment mechanism 440 coupled to turbines 438. Turbines 438 transmit power from fluid 422 to output shaft 434 through inner housing 436. This energy is removed from fluid 422 by changing the speed and direction of fluid 422 traveling through transmission apparatus 416. Thus, power is transmitted from input device 420 to output device 424 through fluid 422.

According to the presently preferred embodiment, series of pumps 430 include first, second, and pumps 444, 446, 448 as shown in FIG. 21. Similarly, series of turbines 438 include first, second, and third turbines 452, 454, 456. When input shaft 426, outer housing 428, and series of pumps 430 rotate in a clockwise direction 460, first, second, and third pumps 444, 446, 448 transfer energy into fluid 422 so that fluid 422 begins to rotate in clockwise direction 460 as well. This clockwise flow of fluid 422 impinges upon first, second, and third turbines 452, 454, 456 so that series of turbines 438, inner housing 436, and output shaft 434 rotate either in clockwise direction 460 or a counterclockwise direction 462 depending on the positioning of first, second, and third turbines 452, 454, 456, as will be discussed in greater detail below.

Each stage of pumps and turbines 430, 438 provides an approximately 2:1 torque ratio. Because there are three stages of pumps and turbines 430, 438, the overall torque ratio of transmission apparatus 416 is approximately 6:1. According to alternative embodiment transmission apparatus, additional stages of pumps and turbines are added to increase the torque ratio. According to alternative embodiments, the output and input blades have either larger or smaller surface areas. By changing the surfaces areas, the torque conversion of each stage is changed. Thus, depending on the particular application, the maximum torque conversion ratio can be designed into the transmission apparatus to match a specific need.

As shown in FIG. 21, inner and outer housings 436, 428 cooperate to define an energy exchange passage 464 in which pumps 430 introduce energy into fluid 422 and turbines 438 remove energy from fluid 422. Inner housing 436 defines a return passage 466 that communicates fluid 422 from an outlet 468 of energy exchange passage 464 to an inlet 470 of energy exchange passage 464. Thus, fluid 422 not only flows in clockwise direction 460, but also travels in a first axial direction 472 through energy exchange passage 464 and in a second axial direction 474 through return passage 466 to inlet 470. For clarity several components are not illustrated in FIG. 21 so that the flow path through return passage 466 can be clearly illustrated.

As fluid 422 travels through energy exchange passage 464, energy is sequentially added and removed from fluid 422 as it passes through series of pumps 430 and turbines 438. As shown in FIG. 21, for example, first pump 444 adds energy to fluid 422 at a first axial location 476 in energy exchange passage 464. Then, first turbine 452 removes energy from fluid 422 at a second axial location 478 in energy exchange passage 464. Second pump 46 then replenishes the energy in fluid 422 by adding energy at a third axial location 480 in energy exchange passage that is then removed by second turbine 454 at a fourth axial location 482 in energy exchange passage 464. Similarly, third pump 448 adds energy to fluid 422 at a fifth axial location 484 that is subsequently removed by third turbine 456 at a sixth axial location 486 in energy exchange passage 464. Thus, pumps 430 and turbines 438 sequentially add and remove energy from fluid 422 as fluid 422 travels in first axial direction 472 so that energy is exchanged from input device 420 to output device 424 through fluid 422.

Third turbine 456 not only removes energy from fluid 422, but directs fluid 422 into return passage 466. Similarly, first pump 444 not only adds energy to fluid 422, but redirects fluid 422 into energy exchange passage 464 to flow in first axial direction 472.

Outer shell 418 is primarily a protective cover that surrounds input and output devices 420, 424. Thus, outer housing 418 forms a substantially rigid and stationary member. Therefore, both input and output devices 420, 424 rotate relative to housing 418 so that both input or output devices 420, 424 are ungrounded.

Input shaft 426 includes a shank 518 formed configured to couple to the power source and a hub 522 coupled to shank 518. As shown in FIG. 21, outer housing 428 of input device 420 includes a first hub 524, a cylindrical body 526 coupled to first hub 524, a second hub 528 coupled to cylindrical body 526, and a sleeve 546 positioned within cylindrical body 526 that abuts second hub 528. First hub 524 is bolted or otherwise fastened to hub 522 of input shaft 426 to provide sealed contact therebetween.

As shown in FIG. 21, first hub 524 is bolted or otherwise fastened through a pair of flanges 536, 538 formed in cylindrical body 526 and first hub 524. An O-ring (not shown) is positioned between cylindrical body 526 and first hub 524 to provide sealed engagement therebetween. Cylindrical body 526 is integral with second hub 528.

Second hub 528 is formed to include first and second curved surfaces 558, 560 configured to redirect or turn fluid 422 from return passage 466 into energy exchange passage 464. First curved surface 558 is configured to redirect or turn fluid 422 from second axial direction 474 to radially outwardly direction 562. Second curved surface 560 is configured to redirect or turn fluid 422 from radially outward direction 562 into first axial direction 472.

As shown in FIG. 21, output shaft 434 rotates about axis of rotation 442 relative to input shaft 426 and outer housing 428. Transmission apparatus 416 further includes a ball bearing 542 positioned between first hub 524 and output shaft 434 to permit output shaft 434 to rotate relative to outer housing 428 and the remainder of input device 420. Similarly, transmission apparatus 416 includes a journal bearing 544 positioned between second hub 528 of outer housing 428 and a portion of turbine adjustment mechanism 440 to permit outer housing 428 to rotate relative to turbine adjustment mechanism 440 and the remainder of output device 424.

Figure 19:
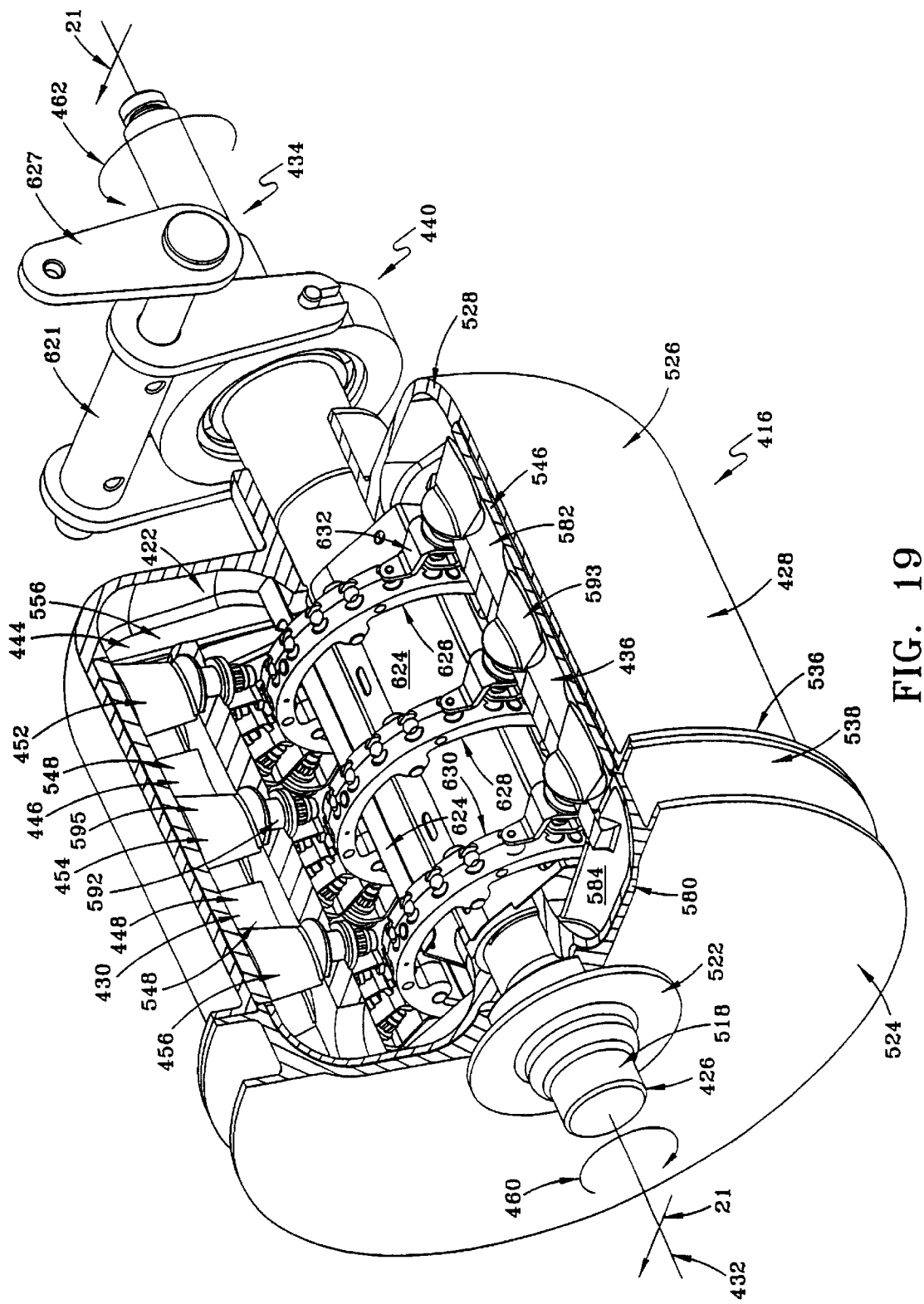
FIG. 19 is a perspective view of another preferred embodiment hydraulic transmission apparatus with portions broken away.
Figure 20:
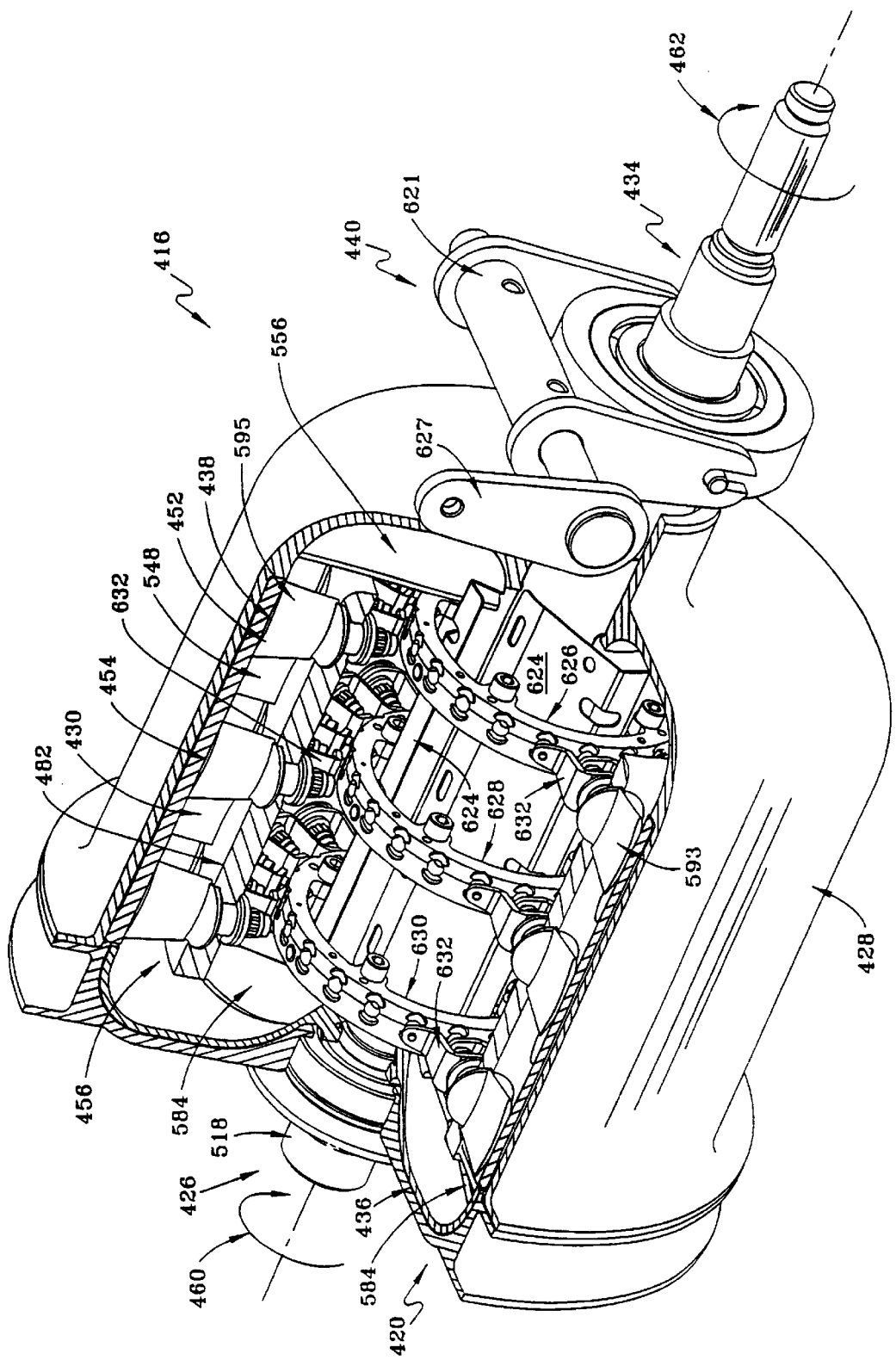
FIG. 20 is a perspective view of the hydraulic transmission apparatus of FIG. 19.

Second and third pumps 446, 448 each include a stage of input blades 548 coupled to sleeve 546 of outer housing 428 as shown in FIGS. 19–21. Each input blade 548 includes a vane 552 coupled to cylindrical base 550. According to the presently preferred embodiment, second and third pumps 446, 448 each include twenty-two input blades 548.

As shown in FIGS. 19–21, preferably, vanes 552 extend radially inwardly and are curved to have a concave surface 553 that "pushes" fluid 422 in clockwise direction 460 and a convex surface 555 opposite concave surface 553. According to alternative embodiments, the surfaces of the vanes are flat. According to other alternative embodiments, the vanes extend in a partial or fully axial direction so that the pumps are partially or fully concentric to one another.

As shown in FIG. 21, first pump 444 includes a set of twisted input blades 556 coupled to second hub 528. As shown in FIG. 2, each input blade 556 extends from an inner portion 557 of second hub 528 to an outer portion 559 of second hub 528. According to an alternative embodiment, the twisted input blades of the first pump and the second hub are cast into a single component. The twisting of input blades 556 create additional axial movement in fluid 422. According to the presently preferred embodiment, first pump 444 includes twenty-two input blades 556.

Output shaft 434 includes a first end 564 and a second end 566 spaced apart from first end 564. First end 564 includes a threaded portion 568 on which a nut 570 is positioned to retain ball bearing 542 on output shaft 454 and a shoulder 588. First end 564 further includes a pair of keyways 572 configured to retain keys 574 to rotationally lock output shaft 534 to inner housing 436. Second end 566 is also formed to include a pair of keyways 576 sized to receive keys 578 to lock output shaft 434 to a preferred work unit.

As shown in FIG. 21, inner housing 436 includes a hub 580 and a cylindrical body 582 coupled to hub 580 by a plurality of twisted blades 584. Hub 580 includes a shoulder 586 that abuts shoulder 588 of output shaft 434 and a pair of keyways 591 sized to receive keys 578.

As shown in FIG. 21, hub 580 includes a pair of curved surfaces 610, 612 configured to redirect or turn fluid 422 from travel in first axial direction 472 to second axial direction 474. First curved surface 610 directs fluid 422 from first axial direction 472 to a radially inward direction 614. Second curved surface 612 directs fluid 422 from radially inward direction 614 to second axial direction 474. Thus, as described earlier, fluid 422 travels in a closed circular path from energy exchange passage 464 to return passage 466 back to energy exchange passage 464.

First, second, and third turbines 452, 454, 456 each include a stage of output blades 590. Each output blade 590 includes a cylindrical base 592 and a vane 594. Cylindrical body 582 of inner housing 436 includes a plurality of apertures 596 configured to receive cylindrical base 592 of output blades 590 so that output blades 590 can rotate about radial axes relative to cylindrical body 582. As will be discussed in greater detail below, turbine adjustment mechanism 440 is coupled to each cylindrical base 592 so that the pitch of vanes 594 is adjustable. According to the presently preferred embodiment, the pitch of each output blade 590 is approximately the same as the other output blades 590. According to alternative embodiments, the pitch of the respective output blades are different. According to the presently preferred embodiment, first, second, and third turbines 452, 454, 456 each include twenty output blades 590.

Preferably, vanes 594 extend radially outwardly and are curved to have a concave surface 593 that "scopes" fluid 422 and a convex surface 595 opposite concave surface 593 as shown in FIG. 20. According to alternative embodiments, the surfaces of the vanes are flat. According to other alternative embodiments, the vanes of the output blades extend in a partial or fully axial direction so that the turbines are partially or fully concentric to one another.

Figure 23:
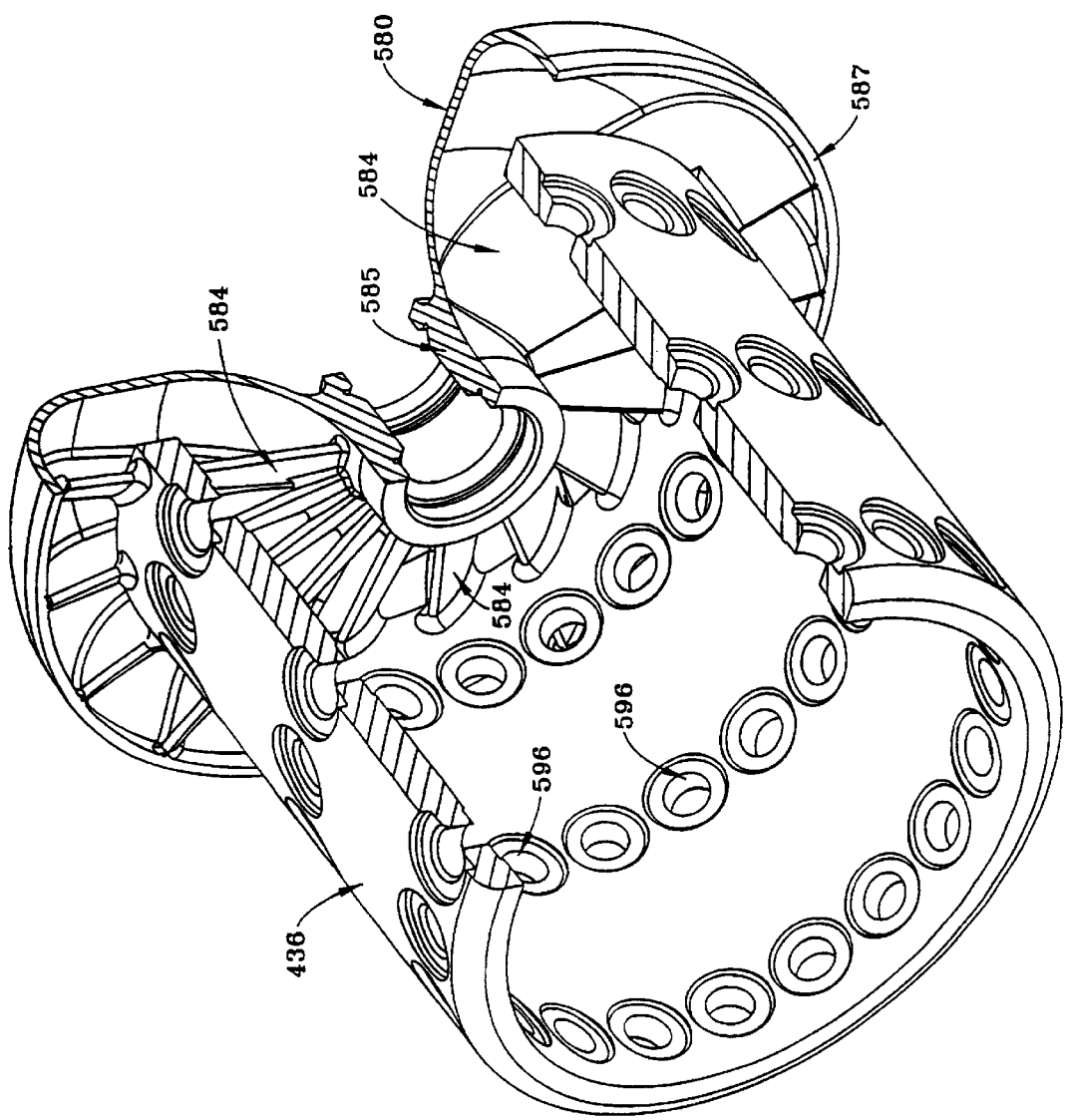
FIG. 23 is a perspective view of another hub of the hydraulic transmission apparatus of FIG. 19 showing several output blades coupled thereto.

Third turbine 456 further includes plurality of twisted output blades 584 that are welded or otherwise coupled to cylindrical body 582 and hub 580. Each adjacent pair of twisted blades 584 cooperates to define a space 598 therebetween defining outlet 468 of energy exchange passage 464. As shown in FIG. 23, each output blade 584 extends from an inner portion 585 of hub 580 to an outer portion 587 of hub 580. According to an alternative embodiment, the twisted blades of the third turbine, the cylindrical body of the output housing, and the hub of the output housing are cast as a single component. According to the presently preferred embodiment, third turbine 458 includes twenty twisted output blades 584.

As shown in FIG. 21, turbine adjustment mechanism 440 includes an actuation lever 616, a ring 618 coupled to actuation lever 616, a ball bearing 620 coupled to ring 618, a sheath 622 rotatably coupled to ball bearing 620, four transfer plates 624 coupled to sheath 622, first, second, and third transfer rings 626, 628, 630, and a plurality of crank arms 632 coupled to first, second and third transfer rings 626, 628, 630 and cylindrical bases 592 of output blades 590. Sheath 622 includes a threaded end 623 having a nut 625 coupled thereto to secure ball bearing 620 to sheath 622.

The pitch of output blades 590 is adjusted by rotating actuation lever 616 with an actuator (not shown) through another lever 627 and shaft 621. When actuated, actuation lever 616 pushes ring 618, ball bearing 620, sheath 622, transfer plates 624, and transfer rings 626, 628, 630 in either first or second axial directions 472, 474. Because crank arms 632 are offset from the center of cylindrical base 592 of output blades 590, the axial movement of transfer rings 626, 628, 630 causes crank arms 632 to rotate output blades 590. To change the pitch back, actuation lever 626 is rotated in the other direction. According to the presently preferred embodiment, output blades 590 are configured to rotate 60°.

During operation of transmission apparatus 416, sheath 622, transfer plates 624, transfer rings 626, 628. 630 and crank arms 632 rotate with output shaft 434, inner housing 436, and turbine 438. However, ring 628 and actuation lever 626 remain stationary with outer shell 418. Ball bearing 620 permits this relative motion and transfers the axial movement between ring 618 and sheath 622. According to an alternative embodiment transmission apparatus, a shield is positioned between the output shaft and the cranks arm to reduce the drag in the fluid return passage.

Operation of transmission apparatus 416 is substantially similar to operation of transmission apparatus 16. Therefore, the modes of operation and control of transmission apparatus 416 is also substantially similar to the modes of operation and control of transmission apparatus 16 and a description of these modes of operation will not be repeated herein.

Figure 18:
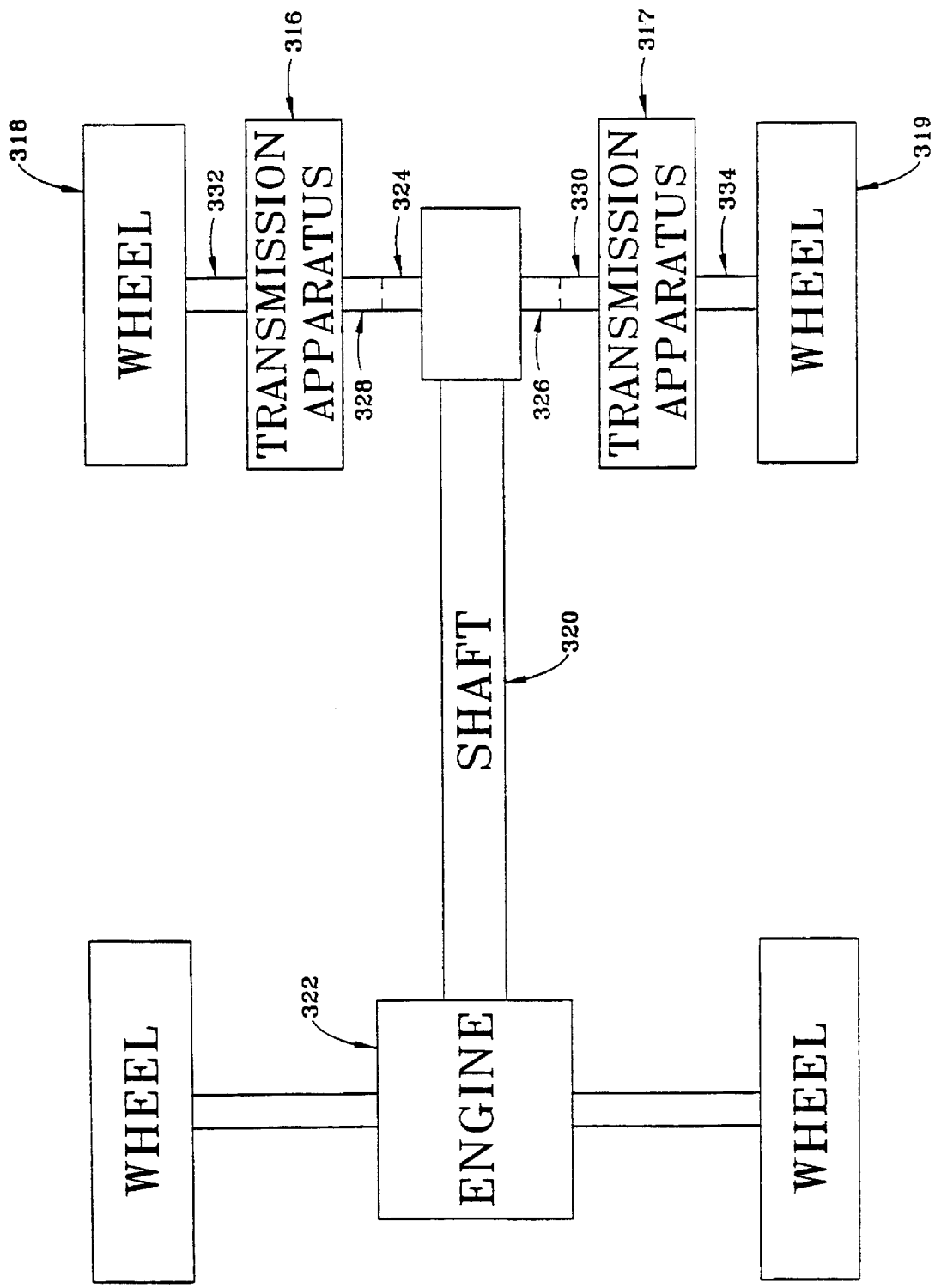
FIG. 18 is a block diagram of a vehicle showing the vehicle including an engine, a split drive shaft coupled to the engine, a pair of transmission apparatus coupled to the split drive shaft, and a pair of drive wheels coupled to the transmission apparatus.

As shown in FIG. 18, a pair of transmission apparatus 316, 317 according to the present disclosure are configured to permit a pair of drive wheels 318, 319 to rotate at different speeds during situations such as cornering, braking on non-uniform surfaces, or slipping of one drive wheel. A split shaft 320 is coupled to an engine 322 or other power unit. Split shaft 320 includes first and second output shafts 324, 326 coupled to respective input shafts 328, 330 of transmission apparatus 316, 317. Input shafts are configured to rotate at the same speed. Output shafts 332, 334 of respective transmission apparatus 316, 317 are coupled to rear drive wheels 318, 319 of the vehicle.

As previously mentioned, output shafts 332, 334 are permitted to rotate at different rates than input shafts 328, 330. Similarly, output shaft 332 is permitted to rotate at a different rate than output shaft 334. Thus, when vehicle 340 turns a comer, wheels 318, 319 may rotate at a different rate so that the wheels do not "shimmy" as the vehicle turns a corner.

If one of wheels 318, 319 begins to slip during start-up or braking, the other wheel 318, 319 will continue to turn with sufficient torque to provide useful power to the vehicle for accelerating or decelerating. Even though one wheel 318, 319 is slipping, input shaft 328, 330 of the other transmission apparatus 317, 316 continues to receive power from split drive shaft 320. Thus, output shafts 332, 334 continue to output power to drive wheels 336, 338 providing useful power capable of pushing or braking the vehicle during slick drive conditions.

Similarly, according to an alternative embodiment vehicle, four transmission apparatus are provided. A drive wheel is coupled to each transmission. When necessary, each wheel can turn at a different rate than the other wheels. At all times, torque is available to each wheel through the respective transmission apparatus even when the other wheels are rotating at a different speed or a different direction.

A pair of transmissions is also provided for vehicles that require independent operation of traction devices. For example, to turn a bulldozer, tank, or other track-driven vehicle, one track is powered while the power to the other track is disengaged or reduced so that one track turns at a faster rate or different direction than the other track. This difference causes the bulldozer to turn. According to the present disclosure, a transmission is provided between a split drive shaft and each traction device. To turn the bulldozer, the operator places a transmission apparatus into neutral and the other transmission is placed into drive or reverse. This causes the bulldozer to turn in the desired direction.

Although the invention has been described in detail with reference to preferred embodiments, variations and modifications exist within the scope and spirit of the invention as described and defined in the following claims.

What is claimed is:

1. A transmission apparatus configured to transmit energy from a power source to a work unit, the transmission apparatus comprising an outer housing defining an interior region containing a fluid, an input shaft configured to rotate about a first axis of rotation, the input shaft being coupled to the power source to receive energy therefrom, an output shaft configured to rotate about a second axis of rotation, the output shaft being coupled to the work unit to transmit energy thereto, a first pump positioned in the interior region of the outer housing, the first pump being coupled to rotate with the input shaft to input a first portion of the energy from the power source into the fluid contained in the interior region of the outer housing, a first turbine positioned in the interior region of the outer housing, the first turbine being positioned to receive energy from the fluid contained in the interior region of the outer housing and to transmit said received energy to the output shaft, a second pump positioned in the interior region of the outer housing in a position spaced apart from the first pump, the second pump being coupled to rotate with the input shaft to input a second portion of the energy from the power source into the fluid contained in the interior region of the outer housing, the first turbine being positioned between the first and second pumps, the first and second pumps being coupled to the housing, the first and second pumps including a plurality of radially extending input blades coupled to the housing, and a second turbine positioned in the interior region of the outer housing in a position spaced apart from the first turbine, the second turbine being positioned to receive energy from the fluid contained in the interior region of the outer housing and to transmit said received energy to the output shaft, the second pump being positioned between the first and second turbines, the fluid following a fluid flow path having a first end defined by a first end surface and a second end defined by a second end surface, the first end surface being configured to rotate relative to the second end surface.

2. The transmission apparatus of claim 1, wherein the input blades have a pitch that is variable.

3. The transmission apparatus of claim 1, wherein the first and second turbines includes a plurality of radially extending output blades configured to rotate with the output shaft.

4. The transmission apparatus of claim 3, wherein the output blades have a pitch that is variable.

5. The transmission apparatus of claim 1, wherein the first and second pumps are axially spaced apart.

6. A transmission apparatus configured to transmit energy from a power source to a work unit, the transmission apparatus comprising an outer housing defining an interior region containing a fluid, an input shaft configured to rotate about a first axis of rotation, the input shaft being coupled to the power source to receive energy therefrom, an output shaft configured to rotate about a second axis of rotation, the output shaft being coupled to the work unit to transmit energy thereto, a first pump positioned in the interior region of the outer housing, the first pump being coupled to rotate with the input shaft to input a first portion of the energy from the power source into the fluid contained in the interior region of the outer housing, a first turbine positioned in the interior region of the outer housing, the first turbine being positioned to receive energy from the fluid contained in the interior region of the outer housing and to transmit said received energy to the output shaft, a second pump positioned in the interior region of the outer housing in a position spaced apart from the first pump, the second pump being coupled to rotate with the input shaft to input a second portion of the energy from the power source into the fluid contained in the interior region of the outer housing, the first turbine being positioned between the first and second pumps, a second turbine positioned in the interior region of the outer housing in a position spaced apart from the first turbine, the second turbine being positioned to receive energy from the fluid contained in the interior region of the outer housing and to transmit said received energy to the output shaft, the second pump being positioned between the first and second turbines, the fluid following a fluid flow path having a first end defined by a first end surface and a second end defined by a second end surface, the first end surface being configured to rotate relative to the second end surface, and an inner housing coupling the first and second turbines to the output shaft.

7. The transmission apparatus of claim 6, wherein the inner and outer housing cooperate to define an outer passage therebetween, the inner housing defines an inner passage, the first and second pumps input energy into the fluid to cause the fluid to flow through the inner and outer passages, the first and second turbines remove energy from the fluid and transfer said energy to the output shaft.

8. A transmission apparatus comprising a pump shaft configured to rotate about a pump axis in a first direction, a turbine shaft configured to rotate about a turbine axis in a second direction, a first pump including a set of pump blades configured to rotate about the pump axis in the first direction to input energy into a fluid following a fluid flow path, a second pump including a set of pump blades configured to rotate about the pump axis in the first direction to input energy into the fluid, and a turbine including a set of turbine blades configured to rotate about the turbine axis in the second direction to remove energy from the fluid, the turbine blades being positioned between the pump blades of the first and second pumps, the fluid flow path having first and second turns, at least one of the turbine and first and second pumps being positioned in one of the first and second turns of the fluid flow path.

9. The transmission apparatus of claim 8, wherein the turbine blades are adjustable.

10. The transmission apparatus of claim 9, wherein the turbine blades are configured to rotate about a radial axis.

11. The transmission apparatus of claim 9, wherein the pump blades are adjustable.

12. The transmission apparatus of claim 8, further comprising an inner housing coupling the turbine blades to the output shaft.

13. The transmission apparatus of claim 12, wherein the turbine blades extend radially outwardly from the inner housing.

14. The transmission apparatus of claim 12, further comprising an outer housing coupling the pump blades of the first and second pumps to the input shaft, wherein the inner and outer housings cooperate to define a first passage therebetween.

15. The transmission apparatus of claim 14, wherein the pump blades extend radially inwardly into the first passage from the outer housing and the turbine blades extend radially outwardly into the first passage from the inner housing.

16. The transmission apparatus of claim 15, wherein the inner housing defines a second passage communicating fluid from an outlet of the first passage to an inlet of the first passage.

17. The transmission apparatus of claim 16, wherein the second passage is positioned radially inwardly of the first passage.

18. A transmission apparatus comprising a housing defining an interior region containing a fluid, the housing including a first housing component and a second housing component coupled to the first housing component, an input shaft configured to rotate about a first axis of rotation, an output shaft configured to rotate independently of the input shaft about a second axis of rotation, a first stage of input blades positioned in the interior region of the housing and coupled to rotate with the input shaft about the first axis of rotation, a second stage of input blades positioned in the interior region of the housing and coupled to rotate with the input shaft about the first axis of rotation, the second stage of input blades being axially spaced apart from the first stage of input blades, a first stage of output blades positioned in the interior region of the housing and coupled to rotate with the output shaft about the second axis of rotation, the first stage of output blades being positioned between the first and second stages of input blades, and a second stage of output blades positioned in the interior region of the housing and coupled to rotate with the output shaft about the second axis of rotation, the second stage of input blades being positioned between the first and second stages of output blades, at least one of the first and second housing components including an opening therein sized to permit placement of at least one of the stages of blades therein.

19. The transmission apparatus of claim 18, wherein axially inner most edges of the first stage of input blades and axially outermost edges of the second stage of input blades cooperage to define a space therebetween and the first stage of output blades are positioned in the space.

20. The transmission apparatus of claim 19, wherein axially inner most edges of the first stage of output blades and axially outer most edge of the second stage of input blades cooperate to define another space therebetween and the second stage of output blades are positioned in the space.

21. The transmission apparatus of claim 18, wherein the first and second stages of input blades cooperate to create a fluid flow path in the transmission apparatus, the first stage of output blades is downstream of the first stage of input blades, the second stage of input blades is downstream of the first stage of output blades, and the second stage of output blades is downstream to the second stage of input blades.

22. The transmission apparatus of claim 21, wherein the first stage of input blades inputs energy into the fluid flow to increase the energy of the fluid flow, the first stage of output blades removes energy from the fluid flow to decrease the energy of the fluid flow, the second stage of input blades inputs energy into the fluid flow to increase the energy of the fluid flow, and the second stage of output blades removes energy from the fluid flow to decrease the energy of the fluid flow.

23. The transmission apparatus of claim 22, wherein the input of energy by the first stage of input blades, the removal of energy by the first stage of output blades, the input of energy by the second stage of input blades, and the removal of energy by the second stage of output blades are sequential.

24. A transmission apparatus configured to receive energy from a power source and to transmit a portion of said energy to a work unit, the transmission apparatus comprising a first shaft configured to receive power from the power source, a second shaft configured to transmit energy to the work unit, means for adding energy from the first shaft to a fluid to create a flow path, the adding means transferring energy received by the first shaft into the fluid at a first location in the flow path and at a second location in the flow path downstream of the first location in the flow path, the adding means including a first pump transferring energy into the fluid at the first location in the flow path and a second pump transferring energy into fluid at the second location in the flow path, the first and second pumps including a plurality of input blades configured to rotate with the input shaft, the input blades extending radially inwardly, and means for removing energy from the fluid in the flow path, the removing means transferring energy from the fluid in the flow path to the second shaft at a third location downstream of the first location and upstream of the second location and at a fourth location downstream of the second location, a portion of the flow path being positioned radially inward relative to at least one of the first, second, third, and fourth locations in the flow path.

25. The transmission apparatus of claim 24, wherein the adding means further includes a housing defining an interior region containing the fluid.

26. The transmission apparatus of claim 25, wherein the first and second pumps are coupled to rotate with the housing and the input shaft.

27. A transmission apparatus configured to receive energy from a power source and to transmit a portion of said energy to a work unit, the transmission apparatus comprising a first shaft configured to receive power from the power source, a second shaft configured to transmit energy to the work unit, means for adding energy from the first shaft to a fluid to create a flow path, the adding means transferring energy received by the first shaft into the fluid at a first location in the flow path and at a second location in the flow path downstream of the first location in the flow path, and means for removing energy from the fluid in the flow path, the removing means transferring energy from the fluid in the flow path to the second shaft at a third location downstream of the first location and upstream of the second location and at a fourth location downstream of the second location, a portion of the flow path being positioned radially inward relative to at least one of the first, second, third, and fourth locations in the flow path, the removing means including a first turbine transferring energy from the fluid at the third location in the flow path, a second turbine transferring energy from the fluid at a fourth location in the flow path, and a shell, the first and second turbines being coupled to the shell, and the shell defining a passage through which the flow path travels.

28. The transmission apparatus of claim 27, wherein the first and second turbines include a plurality of output blades.

29. The transmission apparatus of claim 28, wherein the output blades extend radially outwardly from the shell.

30. A transmission apparatus configured to receive energy from a power source and to transmit a portion of said energy to a work unit, the transmission apparatus comprising a first shaft configured to receive power from the power source, a second shaft configured to transmit energy to the work unit, means for adding energy from the first shaft to a fluid to create a flow path, the adding means transferring energy received by the first shaft into the fluid at a first location in the flow path and at a second location in the flow path downstream of the first location in the flow path, and means for removing energy from the fluid in the flow path, the removing means transferring energy from the fluid in the flow path to the second shaft at a third location downstream of the first location and upstream of the second location and at a fourth location downstream of the second location, a portion of the flow path being positioned radially inward relative to at least one of the first, second, third, and fourth locations in the flow path, the removing means including a first turbine transferring energy from the fluid at the third location in the flow path and a second turbine transferring energy from the fluid at a fourth location in the flow path, the first and second turbines including a plurality of adjustable output blades.

31. The transmission apparatus of claim 30, wherein the adding means includes a first pump transferring energy into the fluid at the first location in the flow path and a second pump transferring energy into fluid at the second location in the flow path.

32. A method for transmitting energy from a power source to a work unit, the method including the steps of providing an input shaft configured to receive power from the power source, a housing having an interior region containing a fluid, and an output shaft configured to transmit power to the work unit, adding energy from the input shaft to the fluid to create a flow path, said addition of energy occurring at a first location in the flow path, removing energy from the fluid at a second location in the flow path downstream of the first location in the flow path, transferring said energy removed from the second location in the flow path to the output shaft, adding energy from the input shaft to the fluid at a third location in the flow path downstream of the second location in the flow path, removing energy from the fluid at a fourth location in the flow path downstream of the third location in the flow path, transferring said energy removed from the second location in the flow path to the output shaft, and reversing the direction of rotation of the output shaft from a first direction to an opposite second direction while the direction of the fluid flow along the flow path remains constant.

33. The method of claim 32, wherein the flow path is closed so that the first location in the flow path is downstream of the fourth location of the flow path.

34. The method of claim 32, wherein the second location in the flow path is axially inward of the first location in the flow path.

35. The method of claim 34, wherein the third location in the flow path is axially inward of the second location in the flow path.

36. The method of claim 35, wherein the fourth location in the flow path is axially inward of the third location in the flow path.

37. The method of claim 32, further comprising the step of providing output blades for removing energy from the fluid.

38. The method of claim 37, further comprising the step of adjusting a pitch of the output blades.

* * * * *